(12) United States Patent
Ishibashi et al.

(10) Patent No.: US 7,474,606 B2
(45) Date of Patent: Jan. 6, 2009

(54) OPTICAL DISK MEDIUM

(75) Inventors: Hiromichi Ishibashi, Osaka (JP);
Shigeru Furumiya, Hyogo (JP);
Atsushi Nakamura, Osaka (JP); Junichi Minamino, Nara (JP); Takashi Ishida, Kyoto (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/279,040

(22) Filed: Apr. 7, 2006

(65) Prior Publication Data

US 2006/0164966 A1    Jul. 27, 2006

Related U.S. Application Data

(62) Division of application No. 10/796,874, filed on Mar. 9, 2004, now Pat. No. 7,116,630, which is a division of application No. 10/173,903, filed on Jun. 17, 2002, now Pat. No. 6,724,708.

(30) Foreign Application Priority Data

| Jun. 20, 2001 | (JP) | ............................. 2001-185729 |
| Jul. 12, 2001 | (JP) | ............................. 2001-212071 |
| Nov. 14, 2001 | (JP) | ............................. 2001-348306 |

(51) Int. Cl.
G11B 7/24 (2006.01)
G11B 7/007 (2006.01)

(52) U.S. Cl. .............. 369/275.4; 369/59.25; 369/47.22; 369/47.27

(58) Field of Classification Search .............. 369/59.25, 369/47.22, 275.1–275.5, 47.27, 44.13, 47.21, 369/47.31, 59.1
See application file for complete search history.

(56) References Cited

U.S. PATENT DOCUMENTS

| 5,119,359 | A | 6/1992 | Miyagi et al. |
| 5,844,882 | A | 12/1998 | Yoshida et al. |
| 5,848,050 | A | 12/1998 | Nagasawa et al. |
| 5,878,024 | A | 3/1999 | Kobayashi et al. |
| 6,269,071 | B1 | 7/2001 | Van Den Enden et al. |
| 6,282,166 | B1 | 8/2001 | Akiyama et al. |

(Continued)

FOREIGN PATENT DOCUMENTS

EP    0 248 536 A2    5/1987

(Continued)

OTHER PUBLICATIONS

Ko, Jungwan, et al., "Wobble Addressing Method for Land and Groove Structured Optical Storage," Japanese Journal of Applied Physics, vol. 40, pp. 1698-1703 (Mar. 2001).

(Continued)

Primary Examiner—Ali Neyzari
(74) Attorney, Agent, or Firm—Panitch Schwarze Belisario & Nadel LLP

(57) ABSTRACT

An optical disk medium includes a track groove thereon. On the optical disk medium, information is recorded along the track groove on a block unit basis. The block unit has a predetermined length. The block unit having the predetermined length includes a number of sub-blocks that are arranged along the groove. A sub-block mark is provided within each of the sub-blocks and used to identify the sub-block.

5 Claims, 19 Drawing Sheets

U.S. PATENT DOCUMENTS

| | | | |
|---|---|---|---|
| 6,301,208 B1 | 10/2001 | Sugaya et al. | |
| 6,377,528 B1 | 4/2002 | Asano | |
| 6,577,590 B2 | 6/2003 | Minamino et al. | |
| 6,608,810 B2 | 8/2003 | Minamino et al. | |
| 6,674,700 B2 | 1/2004 | Minamino et al. | |
| 6,724,708 B2 * | 4/2004 | Ishibashi et al. | 369/59.25 |
| 6,757,239 B2 | 6/2004 | Minamino et al. | |
| 2006/0164966 A1 | 7/2006 | Ishibashi et al. | |
| 2006/0262698 A1 | 11/2006 | Ishibashi et al. | |

FOREIGN PATENT DOCUMENTS

| | | |
|---|---|---|
| EP | 0 326 206 A1 | 1/1989 |
| EP | 0 813 198 A2 | 12/1997 |
| JP | 04-047536 A | 2/1992 |
| JP | 05-189934 A | 7/1993 |
| JP | 05-314538 A | 11/1993 |
| JP | 05-325193 A | 12/1993 |
| JP | 07-105639 A | 4/1995 |
| JP | 07-244925 A | 9/1995 |
| JP | 08-329473 A | 12/1996 |
| JP | 09-326139 A | 12/1997 |
| JP | 10269649 A | 10/1998 |
| JP | 11-096604 A | 4/1999 |
| JP | 11-283280 A | 10/1999 |
| WO | WO 00/43996 A1 | 7/2000 |
| WO | 00/75921 A1 | 12/2000 |
| WO | WO 02/19332 A2 | 3/2002 |

OTHER PUBLICATIONS

Minamino, Jun-Ichi, et al., "Practical Study of Saw-Tooth Wobble Addressing by Theoretical and Experimental Approaches," Japanese Journal of Applied. Physics, vol. 41, pp. 1741-1742, (Mar. 2002).

Furumiya, Shigeru et al., "Optical Disk Recording System of 25 GB Capacity," Optical Data Storage Topical Meeting 2001, Postdeadline Papers, 4 pgs., (Apr. 22-25, 2001).

* cited by examiner

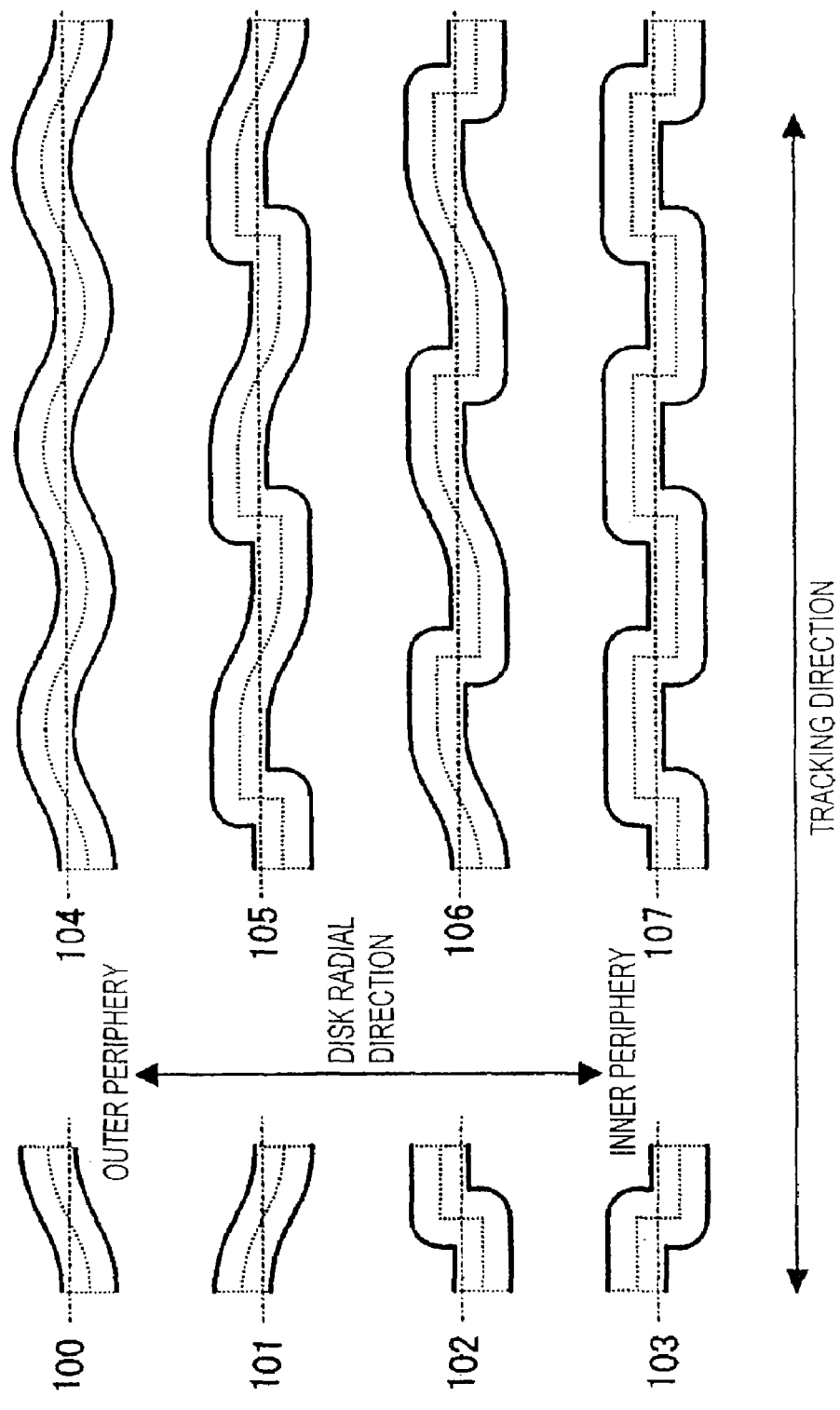

(ADDRESS INFORMATION "1")

(ADDRESS INFORMATION "0")

FIG.24
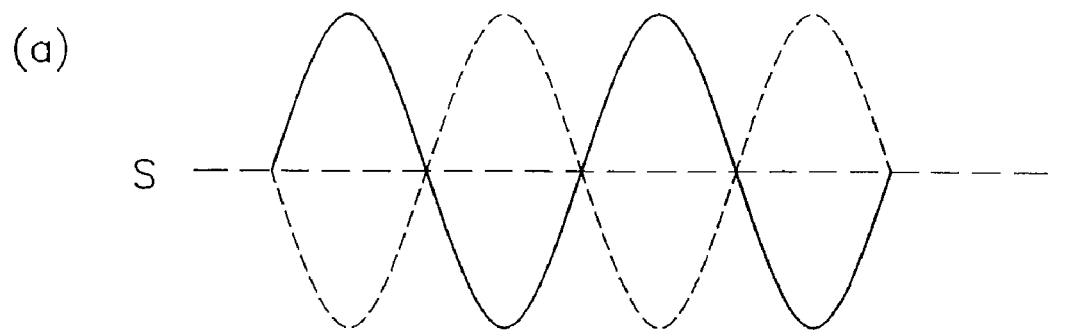
(a) S
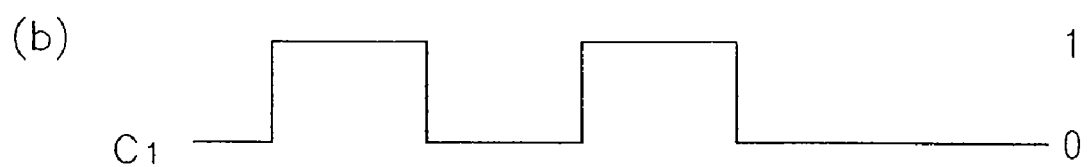
(b) $C_1$           1
               0
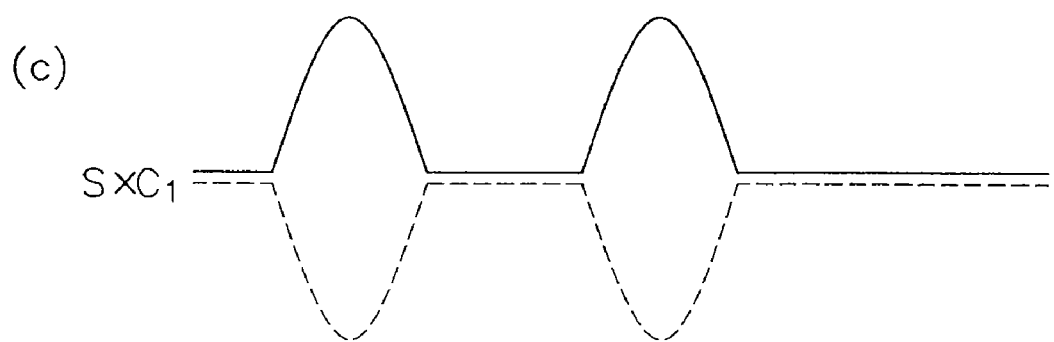
(c) $S \times C_1$

FIG.25
(a) FUNDAMENTAL WAVEFORM
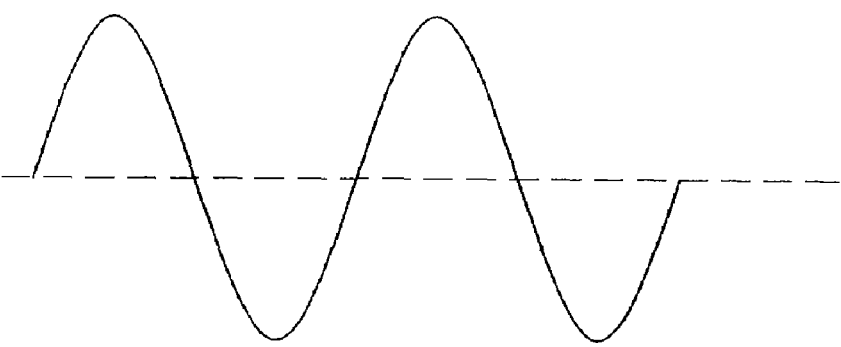
(b) $S_2$
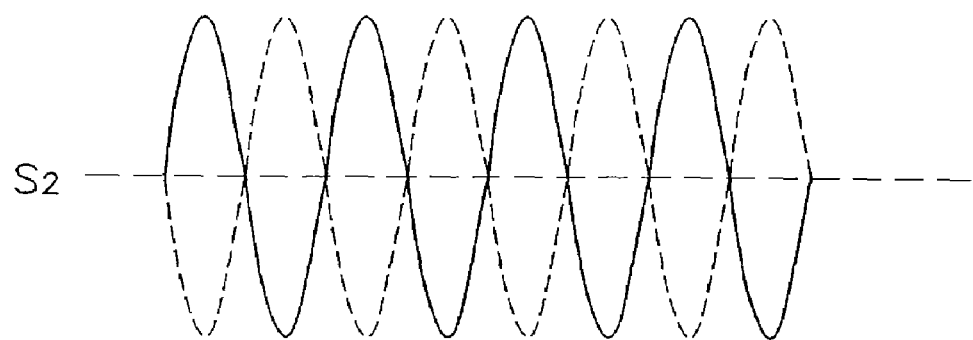
(c) $C_2$
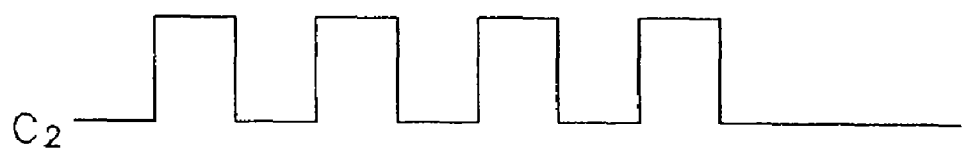
(d) $S_2 \times C_2$
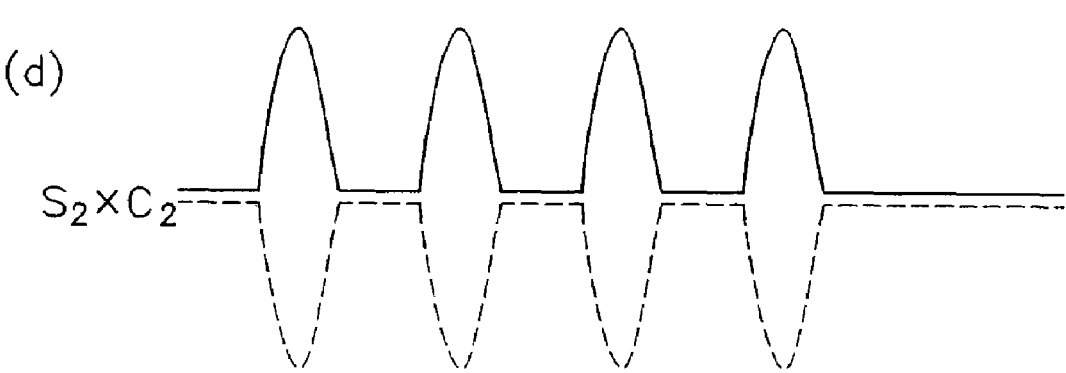

OPTICAL DISK MEDIUM

CROSS-REFERENCE TO RELATED APPLICATIONS

This application is a divisional of U.S. patent application Ser. No. 10/796,874, filed Mar. 9, 2004, which is a divisional of U.S. application Ser. No. 10/173,903, filed Jun. 17, 2002, the disclosure of which is incorporated herein by reference.

BACKGROUND OF THE INVENTION

1. Field of the Invention

The present invention relates to an optical disk on which information (e.g., digital video information) can be stored at a high density.

2. Description of the Related Art

In recent years, the recording density of optical disk media goes on increasing. On an optical disk medium on which data or information can be written by a user, a track groove has normally been formed in advance and a recording film has been formed so as to cover the track groove. Data or information is written by the user on the recording film along the track groove, i.e., either on the track groove or on an area (land) interposed between adjacent parts of the track groove.

The track groove is formed so as to wobble just like a sine wave and a clock signal is generated in accordance with a wobble period. Synchronously with this clock signal, user data is written on, or read out from, the recording film.

To write data at a predetermined location on an optical disk, address information (or location information), indicating physical locations on the optical disk, needs to be allocated to, and recorded at, respective sites on the optical disk while the disk is being manufactured. Normally, an address is allocated to a series of areas that are arranged along a track groove and have a predetermined length. There are various methods for recording such address information on an optical disk. Hereinafter, a conventional method for recording an address on an optical disk will be described.

Japanese Laid-Open Publication No. 6-309672 discloses a disk storage medium on which a wobbling track groove is discontinued locally so that an address-dedicated area is provided for the discontinued part. Pre-pits, representing address information recorded, are formed on the address-dedicated area on the track groove. This optical disk has a structure in which the address-dedicated area and a data-dedicated area (for writing information thereon) coexist on the same track groove.

Japanese Laid-Open Publication No. 5-189934 discloses an optical disk on which address information is recorded by changing the wobble frequency of a track groove. In an optical disk like this, an area on which the address information is recorded and an area on which data will be written are not separated from each other along the track.

Japanese Laid-Open Publication No. 9-326138 discloses an optical disk on which pre-pits are formed between adjacent parts of a track groove. These pre-pits represent the address information recorded.

These various types of optical disks have the following problems to be solved for the purpose of further increasing the recording density.

First, as for the optical disk on which address information is recorded as pre-bits within the address-dedicated area on the track, a so-called "overhead" occurs to secure the address-dedicated area, and the data area should be reduced for that purpose. As a result, the storage capacity available for the user has to be reduced.

Next, as for the optical disk for recording an address thereon by modulating the wobble frequency of the track, a write clock signal cannot be generated precisely enough. Originally, the wobble of the track groove is created mainly to generate a clock signal for establishing synchronization required for read and write operations. Where the wobble frequency is unique, a clock signal can be generated highly precisely by getting a read signal, having amplitude changing with the wobble, synchronized and multiplied by a PLL, for example. However, if the wobble frequency is not unique but has multiple frequency components, then the frequency band that the PLL can follow up should be lowered (as compared to the situation where the wobble has a unique frequency) to avoid pseudo locking of the PLL. In that case, the PLL cannot sufficiently follow up the jitter of a disk motor or a jitter resulting from the eccentricity of a disk. Thus, some jitter might remain in the resultant recording signal.

On the other hand, where the recording film formed on the optical disk is a phase-change film, for example, a signal read out from such a recording film may have a decreased SNR if data is overwritten on the film repeatedly. If the wobble frequency is unique, the noise components are removable using a bandpass filter having a narrow band. However, if the wobble frequency has been modulated, the filter should have its bandwidth broadened. As a result, the noise components are much more likely contained and the jitter might be further worsened. It is expected that the recording density will be further increased from now on. However, the higher the recording density, the narrower the allowable jitter margin will become. Accordingly, it will be more and more necessary to minimize the increase of jitter by avoiding the modulation of the wobble frequency.

In the structure in which the pre-pits representing the address information recorded are formed between adjacent parts of the groove, it is difficult to form long enough pre-pits in sufficiently large numbers. Accordingly, as the recording density is increased, detection errors might increase its number. This is because if large pre-pits are formed between adjacent parts of the groove, then those pits will affect adjacent parts of the track.

SUMMARY OF THE INVENTION

In order to overcome the problems described above, a main object of the present invention is to provide an optical disk medium that contributes to minimizing the overhead and generating a clock signal precisely enough in accordance with the wobble of the track groove.

Another object of this invention is to provide a method and apparatus for reading an address that has been recorded on the optical disk medium.

An optical disk medium according to the present invention includes a track groove thereon. On the optical disk medium, information is recorded along the track groove on a block unit basis. The block unit has a predetermined length. The block unit includes a number of sub-blocks that are arranged along the groove. A sub-block mark is provided within each said sub-block and used to identify the sub-block.

In one preferred embodiment of the present invention, the track groove is preferably provided with a periodic wobble, and the sub-block mark is preferably formed by locally changing the phase of the wobble.

In another preferred embodiment of the present invention, the track groove is preferably provided with a periodic wobble, and the sub-block mark is preferably provided with a wobble having a frequency different from that of the other parts of the track groove.

In still another preferred embodiment, the wobble of the track groove preferably has a shape that represents address information of the block unit.

In this particular preferred embodiment, the wobble of the track groove preferably has a sawtooth shape that represents the address information of the block unit.

Alternatively or additionally, the information represented by the wobble shape of the track groove is preferably also represented by the sub-block.

The present invention provides a method for reading address information from the optical disk medium of the present invention. The method includes the step of generating a first sync signal and multiplying the first sync signal and a read signal together to obtain a first product. The read signal has been detected in accordance with the wobble of the track groove and has a basic frequency. The first sync signal is synchronized with the read signal and has a frequency that is equal to the basic frequency of the read signal. The method further includes the step of generating a second sync signal and multiplying the second sync signal and the read signal together to obtain a second product. The second sync signal is synchronized with the read signal and has a frequency that is twice as high as the basic frequency of the read signal. The method further includes the steps of: integrating the first and second products to obtain an integral; and comparing the integral with a predetermined threshold value, thereby defining the address information.

The present invention further provides an apparatus for reading address information from the optical disk medium of the present invention. The apparatus includes first multiplier, second multiplier, integrating means and comparing means. The first multiplier multiplies a first sync signal and a read signal together. The read signal has been detected in accordance with the wobble of the track groove and has a basic frequency. The first sync signal is synchronized with the read signal and has a frequency that is equal to the basic frequency of the read signal. The second multiplier multiplies a second sync signal and the read signal together. The second sync signal is synchronized with the read signal and has a frequency that is twice as high as the basic frequency of the read signal. The integrating means integrates outputs of the first and second multipliers. And the comparing means compares an output value of the integrating means with a predetermined threshold value, thereby defining the address information.

Another optical disk medium according to the present invention includes a track groove thereon. On the optical disk medium, information is recorded along the track groove. The track groove includes a number of unit sections that are arranged along the track groove and that have side faces displaced periodically along the track groove. Subdivided information is allocated to each said unit section and is represented by a shape that has been given to the side faces of the unit section. Each said unit section has a first side displacement pattern that has been so defined as to make a signal waveform rise relatively steeply and fall relatively gently, or a second side displacement pattern that has been so defined as to make a signal waveform rise relatively gently and fall relatively steeply. An identification mark is formed at the beginning of each said unit section and used to identify the unit section. The identification mark has a side displacement pattern, which is distinguishable from the first and second side displacement patterns, and represents the same information as the subdivided information that is represented by the shape given to its associated unit section.

In one preferred embodiment of the present invention, the information is preferably recorded on the optical disk medium on a block basis. The block preferably has a predetermined length. The block preferably includes a number N of unit sections that are arranged along the track groove.

In another preferred embodiment, the side faces of the track groove are preferably displaced either toward an inner periphery or an outer periphery of the optical disk medium with respect to a centerline of the track groove.

In this particular preferred embodiment, a portion of the side faces, which is shared by at least two of the unit sections, preferably has a constant displacement period within at least one of the blocks.

In still another preferred embodiment, one-bit subdivided information is preferably allocated to each said unit section, and a group of subdivided information representing N bits is preferably recorded on the N unit sections that are included in each said block.

Specifically, each said N-bit subdivided information group preferably includes address information of its associated block to which the N unit sections, where the subdivided information group is recorded, belong.

The prevent invention further provides another method for reading address information from the optical disk medium of the present invention. The method includes the steps of: detecting the identification mark that is provided for each of the unit sections and generating a first signal that corresponds to the information represented by the identification mark detected; generating a second signal that corresponds to the subdivided information represented by the unit section following the identification mark; and defining the subdivided information represented by the unit section in accordance with the first and second signals.

The present invention further provides another apparatus for reading address information from the optical disk medium of the present invention. The apparatus includes: means for detecting the identification mark that is provided for each of the unit sections and generating a first signal that corresponds to the information represented by the identification mark detected; means for generating a second signal that corresponds to the subdivided information represented by the unit section following the identification mark; and means for defining the subdivided information represented by the unit section in accordance with the first and second signals.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2(*a*) illustrates plan views showing wobble pattern elements; and

FIG. 2(*b*) illustrates plan views showing four types of wobble patterns formed by combining the elements shown in FIG. 2(*a*).

FIG. 24 illustrates signal waveform diagrams to describe how the apparatus shown in FIG. 23 may operate.

FIG. 25 illustrates signal waveform diagrams to describe how the apparatus shown in FIG. 23 may operate.

DETAILED DESCRIPTION OF PREFERRED EMBODIMENTS

Figure 1A:
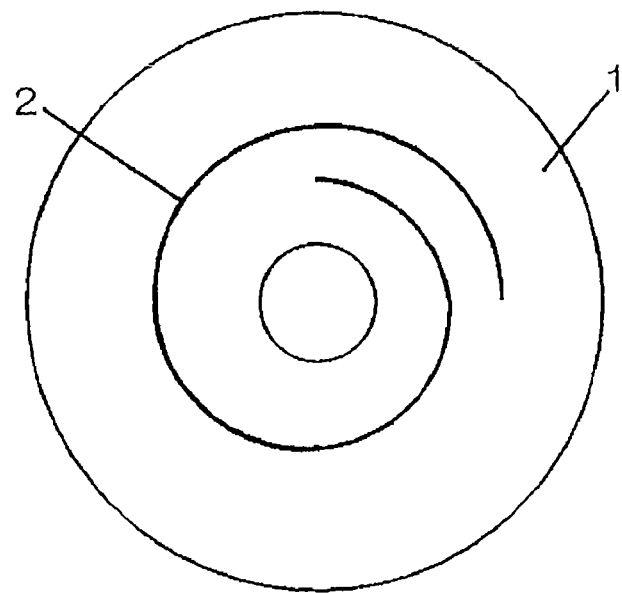
FIG. 1A is a plan view of an optical disk medium according to a preferred embodiment of the present invention.
Figure 1B:
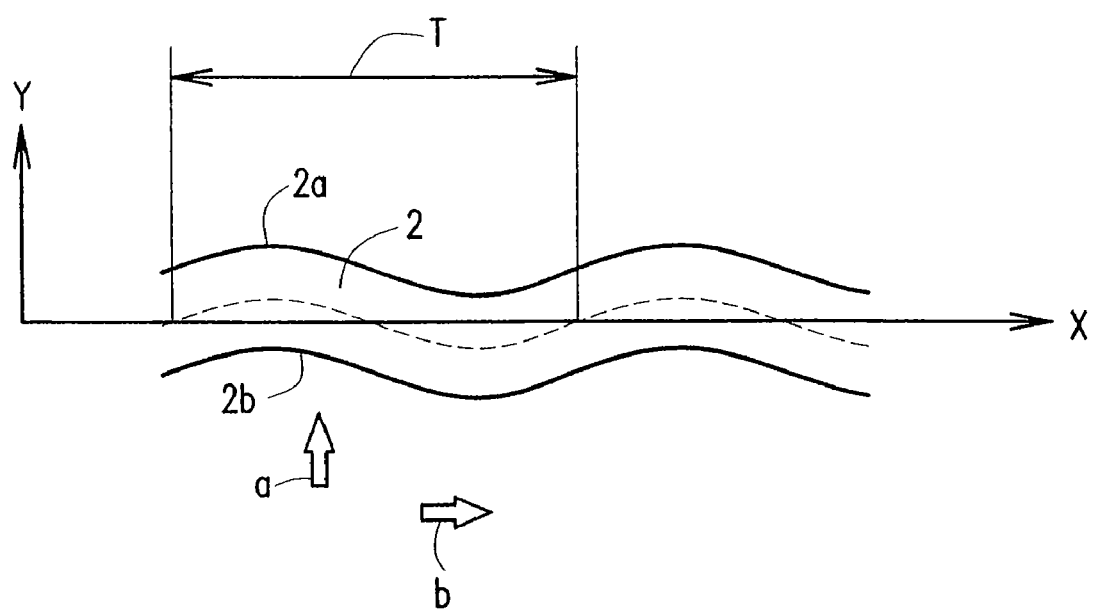
FIG. 1B is a plan view illustrating a planar shape of a track groove on the optical disk medium shown in FIG. 1A.

As shown in FIG. 1A, a spiral track groove 2 has been formed on the recording surface 1 of an optical disk medium according to the present invention. FIG. 1B illustrates a part of the track groove 2 to a larger scale. In FIG. 1B, a disk center (not shown) exists below the track groove 2 and a disk radial direction is indicated by the arrow a. The arrow b points a direction in which a read/write light beam spot, being formed on the disk, moves as the disk is rotated. In the following description, a direction parallel to the arrow a will be herein referred to as a "disk radial direction" (or "radial direction" simply), while a direction parallel to the arrow b will be herein referred to as a "tracking direction".

In a coordinate system in which the light beam spot is supposed to be formed at a fixed location on the disk, a part of the disk irradiated with the light beam (which will be herein referred to as a "disk irradiated part") moves in the direction opposite to the arrow b.

Hereinafter, the X-Y coordinate system illustrated in FIG. 1B will be considered. In an optical disk according to the present invention, the Y coordinate of a location on a side face 2a or 2b of the track groove changes periodically as the X coordinate thereof increases. Such a periodic location displacement on the groove side face 2a or 2b will be herein referred to as the "wobble" or "wobbling" of the track groove 2. A displacement in the direction pointed by the arrow a will be herein referred to as an "outward displacement", while a displacement in the direction opposite to the arrow a will be herein referred to as an "inward displacement". Also, in FIG. 1B, one wobble period is identified by "T". The wobble frequency is inversely proportional to one wobble period T and is proportional to the linear velocity of the light beam spot on the disk.

In the illustrated example, the width of the track groove 2 is constant in the tracking direction (as indicated by the arrow b). Accordingly, the amount to which a location on the side face 2a or 2b of the track groove 2 is displaced in the disk radial direction (as indicated by the arrow a) is equal to the amount to which a corresponding location on the centerline of the track groove 2 (as indicated by the dashed line) is displaced in the disk radial direction. For this reason, the displacement of a location on the side face of the track groove in the disk radial direction will be herein simply referred to as the "displacement of the track groove" or the "wobble of the track groove". It should be noted, however, that the present invention is not limited to this particular situation where the centerline and the side faces 2a and 2b of the track groove 2 wobble to the same amount in the disk radial direction. Alternatively, the width of the track groove 2 may change in the tracking direction. Or the centerline of the track groove 2 may not wobble but only the side faces of the track groove may wobble.

In the present invention, the wobbling structure of the track groove 2 is defined as a combination of multiple types of displacement patterns. That is to say, the planar shape of the track groove 2 does not consist of just the sine waveform shown in FIG. 1B but at least part of it has a shape different from the sine waveform. A basic configuration for such a wobbled groove is disclosed in the descriptions of Japanese Patent Application Nos. 2000-6593, 2000-187259 and 2000-319009 that were filed by the applicant of the present application.

As for the track groove 2 shown in FIG. 1B, the Y coordinate of a location on the centerline of the groove may be represented by a function $f_0(x)$ of the X coordinate thereof. In that case, $f_0(x)$ may be given by "constant·sin $(2\pi x/T)$", for example.

Hereinafter, the configurations of wobble patterns adopted in the present invention will be described in detail with reference to FIGS. 2(a) and 2(b).

FIG. 2(a) illustrates the four types of basic elements that make up a wobble pattern of the track groove 2. In FIG. 2(a), smooth sine waveform portions 100 and 101, a rectangular portion 102 with a steep outward displacement and a rectangular portion 103 with a steep inward displacement are shown. By combining these elements or portions with each other, the four types of wobble patterns 104 through 107 shown in FIG. 2(b) are formed.

The wobble pattern 104 is a sine wave with no rectangular portions. This pattern will be herein referred to as a "basic waveform". It should be noted that the "sine wave" is not herein limited to a perfect sine curve, but may broadly refer to any smooth wobble.

The wobble pattern 105 includes portions that are displaced toward the disk outer periphery more steeply than the sine waveform displacement. Such portions will be herein referred to as "outwardly displaced rectangular portions".

In an actual optical disk, it is difficult to realize the displacement of a track groove in the disk radial direction vertically to the tracking direction. Accordingly, an edge actually formed is not perfectly rectangular. Thus, in an actual optical disk, an edge of a rectangular portion may be displaced relatively steeply compared to a sine waveform portion and does not have to be perfectly rectangular. As can also be seen from FIG. 2(b), at a sine waveform portion, a displacement from the innermost periphery toward the outermost periphery is completed in a half wobble period. As for a rectangular portion, a similar displacement may be finished in a quarter or less of one wobble period, for example. Then, the difference between these shapes is still distinguishable easily enough.

The wobble pattern 106 is characterized by inwardly displaced rectangles while the wobble pattern 107 is characterized by both "inwardly displaced rectangles" and "outwardly displaced rectangles".

The wobble pattern 104 consists of the basic waveform alone. Accordingly, the frequency components thereof are defined by a "basic frequency" that is proportional to the inverse number of the wobble period T. In contrast, the frequency components of the other wobble patterns 105 through 107 include not only the basic frequency components but also high-frequency components. Those high-frequency components are generated by the steep displacements at the rectangular portions of the wobble patterns.

If the coordinate system shown in FIG. 1B is adopted for each of these wobble patterns 105 through 107 to represent the Y coordinate of a location on the track centerline by a function of the X coordinate thereof, then the function may be extended into Fourier series. The expanded Fourier series will include a term of a sin function having an oscillation period shorter than that of sin (2πx/T), i.e., a harmonic component. However, each of these wobble patterns includes a fundamental wave component. The frequency of the basic waveform will be herein referred to as a "wobble frequency". The four types of wobble patterns described above have a common wobble frequency.

In the present invention, instead of modulating the wobble frequency of the track groove 2 to write address information thereon, the multiple types of wobble patterns are combined with each other, thereby recording various types of information, including the address information, on the track groove. More specifically, by allocating one of the four types of wobble patterns 104 through 107 to each predetermined section of the track groove, four types of codes (e.g., "B", "S", "0" and "1", where "B" denotes block information, "S" denotes synchronization information and a combination of zeros and ones represents an address number or an error detection code thereof) may be recorded.

Next, the fundamentals of an inventive method for reading information, which has been recorded by the wobble of the track groove, from the optical disk will be described with reference to FIGS. 3A and 3B.

Figure 3A:
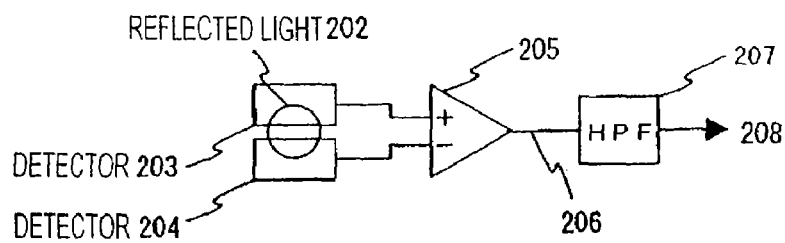
FIG. 3A illustrates a basic configuration for an apparatus that can identify the type of a given wobble pattern by a wobble signal having amplitude changing with the wobble of a track groove.
Figure 3B:
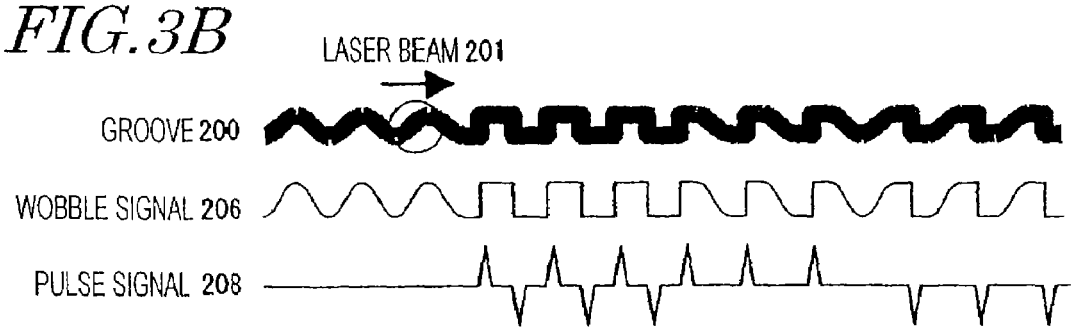
FIG. 3B illustrates waveform diagrams showing a wobble pattern of the track groove, the wobble signal and a pulse signal.

First, FIGS. 3A and 3B will be referred to.

FIG. 3A illustrates a main portion of a reproducing apparatus, while FIG. 3B illustrates a relationship between the track groove and a read signal.

The track groove 200 schematically illustrated in FIG. 3B is scanned by a read laser beam 201 so that the spot thereof moves in the direction indicated by the arrow shown in FIG. 3B. The laser beam 201 is reflected from the optical disk to form reflected light 202, which is received at detectors 203 and 204 of the reproducing apparatus shown in FIG. 3A. The detectors 203 and 204 are located apart from each other in a direction corresponding to the disk radial direction and each output a voltage corresponding to the intensity of the light received. If the position at which the detectors 203 and 204 are irradiated with the reflected light 202 (i.e., the position at which the light is received) shifts toward one of the detectors 203 and 204 with respect to the centerline that separates the detectors 203 and 204 from each other, then a difference is created between the outputs of the detectors 203 and 204 (which is "differential push-pull detection"). The outputs of the detectors 203 and 204 are input to a differential circuit 205, where a subtraction is carried out on them. As a result, a signal corresponding to the wobble shape of the groove 200 (i.e., a wobble signal 206) is obtained. The wobble signal 206 is input to, and differentiated by, a high-pass filter (HPF) 207. Consequently, the smooth fundamental components that have been included in the wobble signal 206 are attenuated and instead a pulse signal 208, including pulse components corresponding to rectangular portions with steeps gradients, is obtained. As can be seen from FIG. 3B, the polarity of each pulse in the pulse signal 208 depends on the direction of its associated steep displacement of the groove 200. Accordingly, the wobble pattern of the groove 200 is identifiable by the pulse signal 208.

Figure 3C:
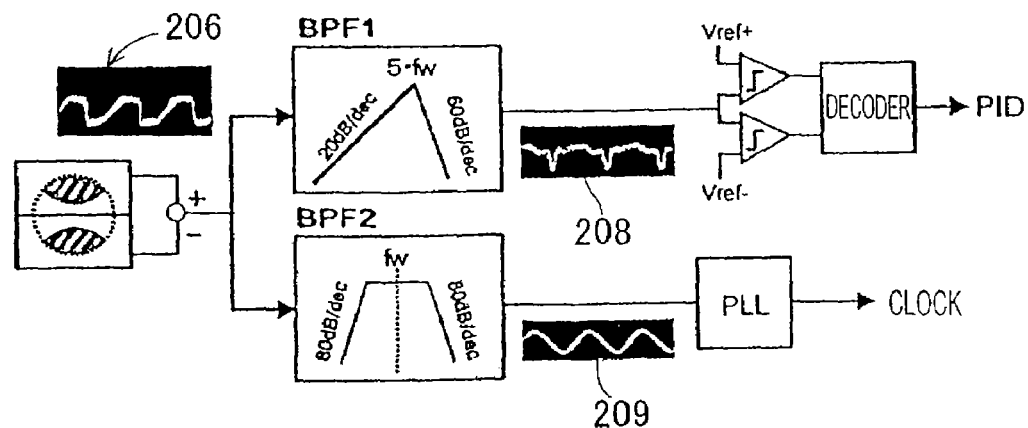
FIG. 3C illustrates a circuit configuration for extracting the pulse signal and a clock signal from the wobble signal.

Next, referring to FIG. 3C, illustrated is an exemplary circuit configuration for generating the pulse signal 208 and a clock signal 209 from the wobble signal 206 shown in FIG. 3B.

In the exemplary configuration illustrated in FIG. 3C, the wobble signal 206 is input to first and second bandpass filters BPF1 and BPF2, which generate the pulse and clock signals 208 and 209, respectively.

Supposing the wobble frequency of the track is fw (Hz), the first bandpass filter BPF1 may be a filter having such a characteristic that the gain (i.e., transmittance) thereof reaches its peak at a frequency of 4 fw to 6 fw (e.g., 5 fw). In a filter like this, the gain thereof preferably increases at a rate of 20 dB/dec, for example, in a range from low frequencies to the peak frequency, and then decreases steeply (e.g., at a rate of 60 dB/dec) in a frequency band exceeding the peak frequency. In this manner, the first bandpass filter BPF1 can appropriately generate the pulse signal 208, representing the rectangularly changing portions of the track wobble, from the wobble signal 206.

On the other hand, the second bandpass filter BPF2 has such a filtering characteristic that the gain thereof is high in a predetermined frequency band (e.g., in a band ranging from 0.5 fw to 1.5 fw and including the wobble frequency fw at the center) but is small at the other frequencies. The second bandpass filter BPF2 like this can generate a sine wave signal, having a frequency corresponding to the wobble frequency of the track, as the clock signal 209.

Hereinafter, preferred embodiments of the optical disk medium according to the present invention will be described in detail.

Embodiment 1

A spiral track groove 2 such as that shown in FIG. 1A is also formed on the recording surface 1 of an optical disk according to this preferred embodiment.

Figure 4:
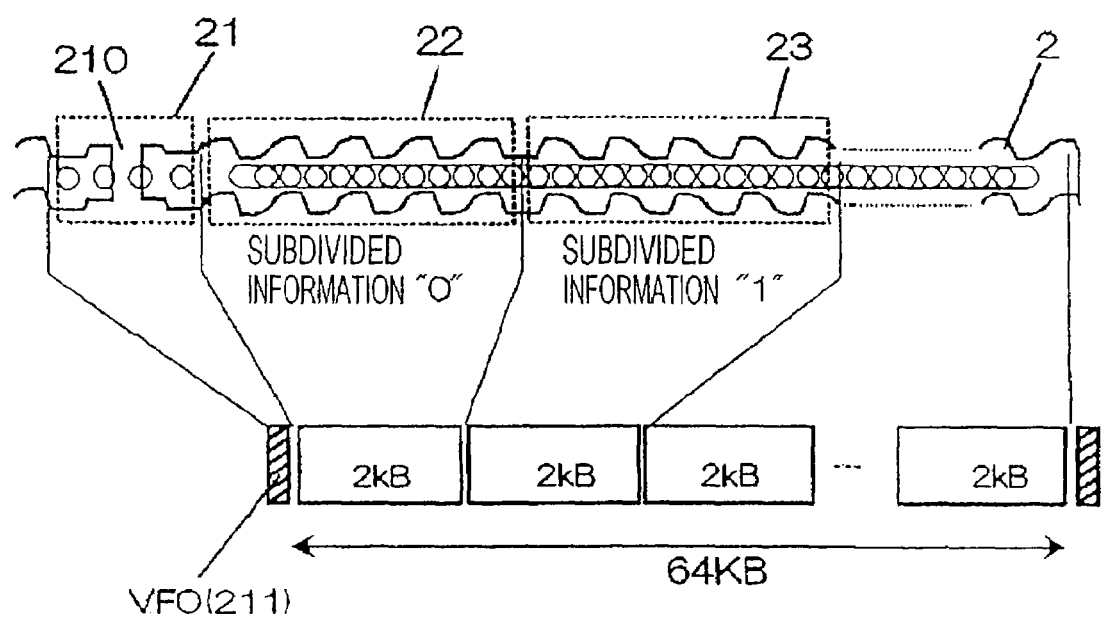
FIG. 4 illustrates a main portion of an optical disk medium according to a first preferred embodiment of the present invention.

FIG. 4 illustrates the shape of the track groove 2 of this preferred embodiment. The track groove 2 is divided into a plurality of blocks, and a block mark (identification mark) 210 for use as a positioning mark is provided between two adjacent blocks. The block mark 210 of this preferred embodiment is formed by discontinuing the track groove 2 for just a short length.

The track groove 2 includes a plurality of unit sections 22, 23, and each block is made up of a predetermined number of unit sections 22, 23. An arbitrary wobble pattern, selected from a plurality of wobble patterns, may be allocated to each unit section. In the example illustrated in FIG. 4, the wobble patterns 106 and 105 shown in FIG. 2(b) are allocated to the unit sections 22 and 23, respectively.

Each of these wobble patterns 105 and 106 carries a one-bit information element (i.e., "0" or "1"), which will be herein referred to as "subdivided information". By identifying the type of the wobble pattern allocated to each unit section of the track groove, the contents of the subdivided information allocated to the unit section can be read. Accordingly, various types of information can be read based on multi-bit subdivided information.

As described above, the difference in waveform between the wobble patterns is represented as a difference in gradient between the leading edges or the trailing edges of the read signals as obtained by the differential push-pull detection. Accordingly, the wobble pattern of the unit section 22, for example, is easily identifiable as one of the wobble patterns 105 and 106 shown in FIG. 2(b). However, when this detection is performed by differentiating the read signal in the above-described manner, noise components increase. For that reason, if this technique is applied to a high-density optical disk medium that results in a low SN ratio, then detection errors may occur. To avoid the occurrence of such detection errors, the following technique is adopted in this preferred embodiment.

The information to be written by the user on the disk (which will be herein referred to as "recording information") is written over several blocks along the track groove on the recording layer. The recording information is written on a block-by-block basis. Each block extends from the block mark 210 along the track groove 2 and has a predetermined length of e.g., 64 kilobytes. A block like this is a unit of information processing and may mean an ECC block, for example. Each block is made up of a number N (which is a natural number) of sub-blocks. When each block has a length of 64 kilobytes and each sub-block has a length of 2 kilobytes, the number N of sub-blocks included in one block is 32.

In this preferred embodiment, the areas on the track groove where the information for respective sub-blocks should be written correspond to the unit sections 22, 23 of the track groove.

Since one-bit subdivided information "0" or "1" is recorded on each of the unit sections 22 and 23, a group of subdivided information of N=32 bits is allocated to each block. In this preferred embodiment, the address of the block is indicated by this group of subdivided information of 32 bits.

For example, where each unit section has a length of 2,418 bytes (=2,048 bytes plus parity) and one wobble period has a length corresponding to 11.625 bytes, a wobble pattern for 208 periods is included in each unit section. Accordingly, the wobble signal 206 shown in FIGS. 3B and 3C may be detected over 208 wobble periods (i.e., a wave number of 208) to identify the type of the given wobble pattern. For that reason, even if some detection errors have been caused by noise during signal reading, the subdivided information is identifiable accurately enough.

More specifically, the differentiated waveform of the differential push-pull signal (i.e., the pulse signal 208) may be sampled and held every time the signal rises or falls. And if the accumulated value of the number of rises is compared to that of the number of falls, then the noise components are canceled. As a result, the subdivided information components can be extracted highly accurately.

The block mark 210 shown in FIG. 4 is formed by discontinuing the track groove 2 for just a short length. Accordingly, if information is overwritten on that part of the recording layer over the block mark 210, then some problems will occur. Specifically, since the quantity of light reflected greatly changes depending on whether or not the groove is present at the spot, the existence of the block mark 210 causes a disturbance in the read signal. Thus, in this preferred embodiment, a VFO (variable frequency oscillator) recording area 21 is allocated to an area 21 of a predetermined length including the block mark 210. The VFO recording area 21 is an area where a monotone signal VFO is written. VFO is a signal for locking a PLL required for reading the recorded information. Even when there is any disturbance or variation, the VFO signal would cause a jitter just locally but no errors. Also, the VFO signal has a single repetitive frequency. Accordingly, it is possible to separate the disturbance caused by the block mark. However, the signal to be written on the VFO recording area 21 does not have to have a single frequency, but may have a particular pattern and a spectral bandwidth narrow enough to separate the frequency thereof from that of a signal corresponding to the block mark 210.

Embodiment 2

Hereinafter, an optical disk reproducing apparatus having the function of reading an address on the optical disk medium of the first preferred embodiment will be described with reference to FIG. 5.

A laser beam, emitted from the optical head 331 of this reproducing apparatus, impinges onto an optical disk 1, thereby forming a light spot on the track groove of the optical disk 1. A drive mechanism is controlled in such a manner that the light spot moves on the track groove as the optical disk 1 is rotated.

The optical head 331 then receives the laser beam that has been reflected by the optical disk 1, thereby generating an electric signal. The electric signal is output from the optical head 331 and then input to a read signal processor 332 where the electric signal is subjected to operation processing. In response to the signal supplied from the optical head 331, the read signal processor 332 generates and outputs a fully added signal and a wobble signal (i.e., push-pull signal).

The wobble signal is input to a wobble PLL circuit 333. The wobble PLL circuit 333 generates a clock signal from the wobble signal and then delivers the clock signal to a timing generator 335. The clock signal has a frequency obtained by multiplying the wobble frequency. It should be noted that before the wobble PLL circuit 333 is phase-locked, a timing signal may also be generated by using a reference clock signal although the precision is inferior.

The fully added signal, output from the read signal processor 332, is input to a block mark detector 334. In accordance with the fully added signal, the block mark detector 334 locates the block mark 210. In the optical disk of the first preferred embodiment, the laser beam, reflected from a part where the block mark 210 is present, has a higher intensity than the other parts. Accordingly, when the level of the fully added signal exceeds a predetermined level, the block mark detector 334 generates a block mark detection signal and sends it out to the timing generator 335.

In response to the block mark detection signal and the clock signal, the timing generator 335 counts the number of clock pulses from the beginning of a block. By performing this counting, it is possible to determine the timing at which the wobble signal should rise or fall, the timing at which the information is subdivided and the timing at which each block is sectioned.

A first shape counter 336 counts the number of times the gradient of the wobble signal rising is equal to or greater than a predetermined value $U_{TH}$ for each unit section. More specifically, if the gradient of the push-pull signal is equal to or greater than the predetermined value $U_{TH}$ when the wobble signal rises, the counter 336 increments its count C1 by one. On the other hand, if the gradient is less than $U_{TH}$, then the counter 336 does not change its count C1 but holds it. The timing at which the wobble signal rises is defined by the output signal of the timing generator 335.

A second shape counter 337 counts the number of times the gradient of the wobble signal falling is equal to or smaller than a predetermined value $D_{TH}$ for each unit section. More specifically, if the gradient of the push-pull signal is equal to or smaller than the predetermined value $D_{TH}$ when the wobble signal falls, the counter 337 increments its count C2 by one. On the other hand, if the gradient is larger than $D_{TH}$, then the counter 337 does not change its count C2 but holds it. The timing at which the wobble signal falls is also defined by the output signal of the timing generator 335.

A subdivided information detector 338 compares the count C1 of the first shape counter 336 with the count C2 of the second shape counter 337 in response to the timing signal that has been generated by the timing generator 335 to indicate the timing at which the information should be subdivided. If $C1 \geq C2$ is satisfied for a certain unit section, then the detector 338 outputs "1" as the subdivided information of the unit section. On the other hand, if $C1 < C2$ is satisfied for a unit section, then the detector 338 outputs "0" as the subdivided information of the unit section. In other words, the detector 338 decides the type of the wobble signal by majority on a unit section basis.

An error corrector 339 makes an error correction on the group of subdivided information allocated to a plurality of unit sections included in one block, thereby obtaining address information.

These circuits do not have to be separately implemented as mutually independent circuits. Alternatively, a single circuit component may be shared by a plurality of circuits. Also, the functions of these circuits may be executed by a digital signal processor whose operation is controlled in accordance with a program pre-stored on a memory. The same statement will also be true of each of the following various preferred embodiments of the present invention.

Embodiment 3

Figure 6:
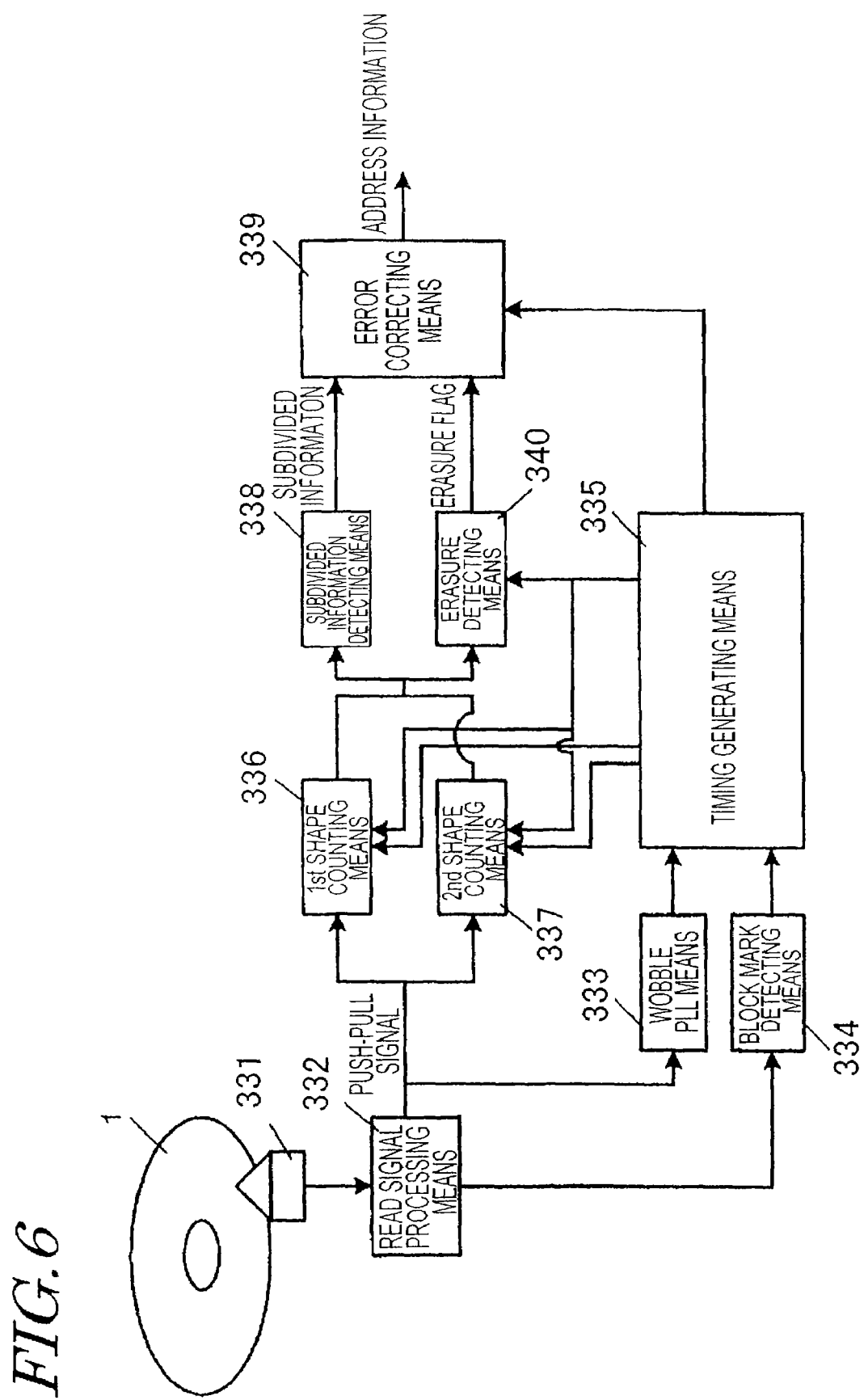
FIG. 6 illustrates a configuration for an optical disk reproducing apparatus according to a third preferred embodiment of the present invention.

Another preferred embodiment of the optical disk reproducing apparatus according to the present invention will be described with reference to FIG. 6. The optical disk reproducing apparatus of this preferred embodiment is different from the apparatus for reading address information according to the second preferred embodiment in that the reproducing apparatus further includes an erasure detector 340. The error corrector 339 also has a different function. In the other respects, the apparatus of this preferred embodiment is the same as the counterpart of the second preferred embodiment. Thus, the description of the components commonly used for these two preferred embodiments will be omitted herein.

The erasure detector 340 compares the count C1 output from the first shape counter 336 with the count C2 output from the second shape counter 337 for each unit section. And when an inequality $-E < C1-C2 < +E$ is satisfied with respect to a predetermined value E, the detector 340 outputs an erasure flag of "1" indicating that the subdivided information is not definitely identifiable. On the other hand, if the inequality $-E < C1-C2 < +E$ is not satisfied, the detector 340 outputs an erasure flag of "0".

If the erasure flag is "1", the error corrector 339 erases the subdivided information, thereby making an error correction compulsorily.

In this preferred embodiment, error bits are erased using the erasure flags in this manner. Thus, the number of error-correctible bits of an error correction code is doubled.

It should be noted that as the erasure flag, "0" may be output when $C1-C2 \leq -E$, "X" may be output when $-E < C1-C2 < +E$ and "1" may be output when $+E \leq C1-C2$. In that case, if the erasure flag is "X", the error correction may be made compulsorily.

As described above, in the optical disk reproducing apparatus of this preferred embodiment, if subdivided information is not definitely identifiable due to a small difference between the first and second shape counts, then bits in question are erased during an error correction process. In this manner, the error correction ability is improved and an address can be read more reliably.

Embodiment 4

An inventive method for reading an address on an optical disk medium will be described with reference to FIG. 7.

Figure 7:
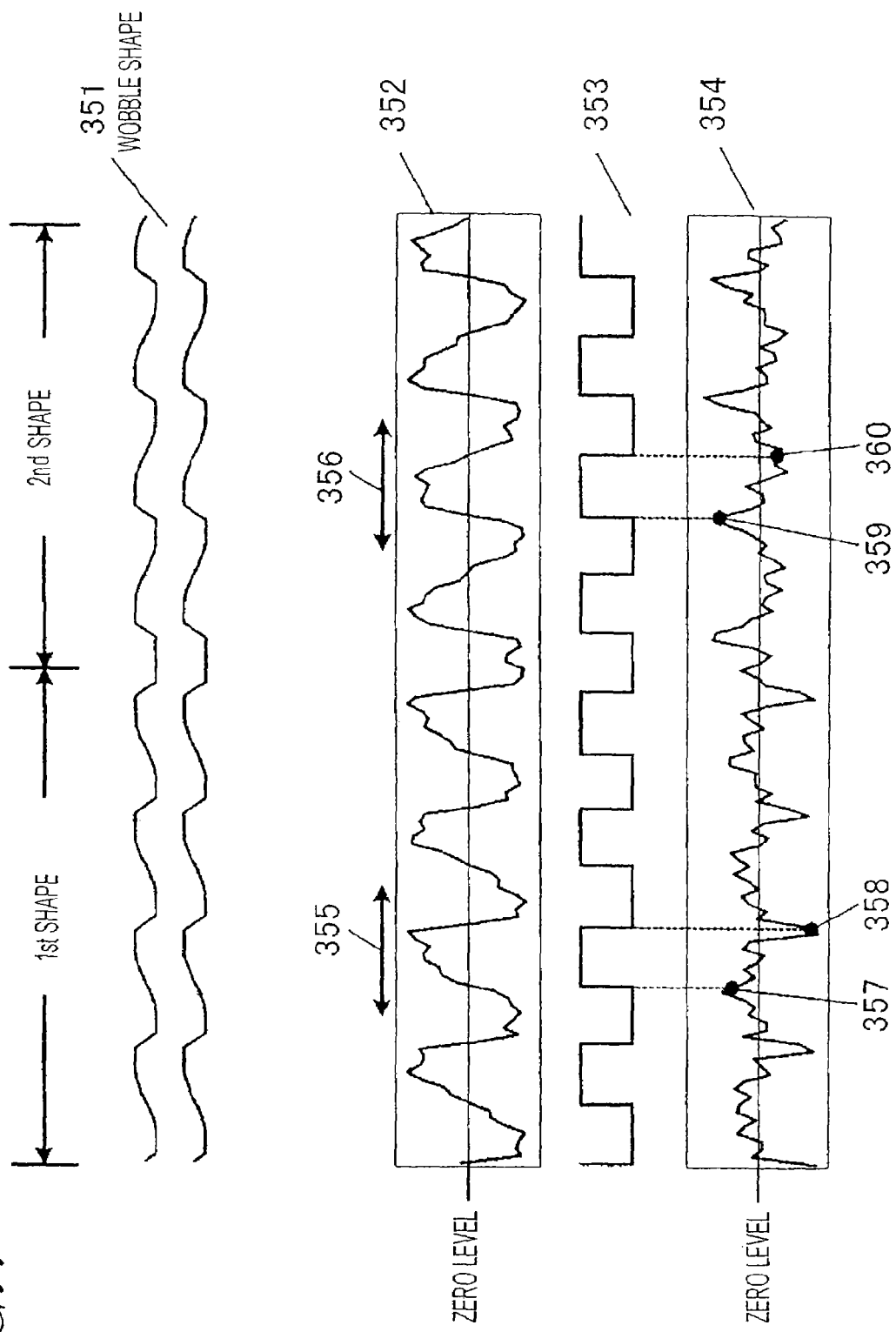
FIG. 7 illustrates an address reading method according to a fourth preferred embodiment of the present invention.

A wobble shape 351 is schematically illustrated on the upper part of FIG. 7. In the left half of the wobble shape 351, falling displacements are steep. In the right half thereof on the other hand, rising displacements are steep.

The wobble signal 352 as represented by a push-pull signal has had its quality deteriorated by noise or waveform distortion.

A digitized signal 353 is obtained by slicing the wobble signal 352 at zero level. A differentiated signal 354 is obtained by differentiating the wobble signal 352. The differentiated signal 354 contains information about the gradients of the wobble shape. A number of peaks, reflecting noise or waveform distortion, are observed here and there in addition to those peaks representing the gradients detected for displacement points.

For the sake of simplicity, only first and second parts 355 and 356 that are arbitrarily selected from the wobble signal will be described.

In the first part 355 of the wobble signal, when the values 357 and 358 of the differentiated signal 354 that are sampled with respect to leading and trailing edges of the digitized signal 353, respectively, have their absolute values compared with each other, the sampled value 358 has the greater absolute value. Accordingly, it may be decided that the wobble signal including the first part 355 has a wobble pattern in which a falling displacement is steeper than a rising displacement.

In the same way, as for the second part 356 of the wobble signal, when the values 359 and 360 of the differentiated signal 354 that are sampled with respect to leading and trailing edges of the digitized signal 353, respectively, have their absolute values compared with each other, the sampled value 359 has the greater absolute value. Accordingly, it may be decided that the wobble signal including the second part 356 has a wobble pattern in which a rising displacement is steeper than a falling displacement.

By making such a decision on a wobble period basis and by accumulating the decisions, the type of each subdivided information unit is identifiable by majority.

In this manner, according to the address reading method of the present invention, the differentiated signal is sampled only at the timings corresponding to the edges of the signal obtained by digitizing the wobble signal, and the sampled values are compared with each other. As a result, the gradients of the wobble shape at the displacement points are detectable highly reliably even under some disturbance such as noise or waveform distortion.

Embodiment 5

Figure 8:
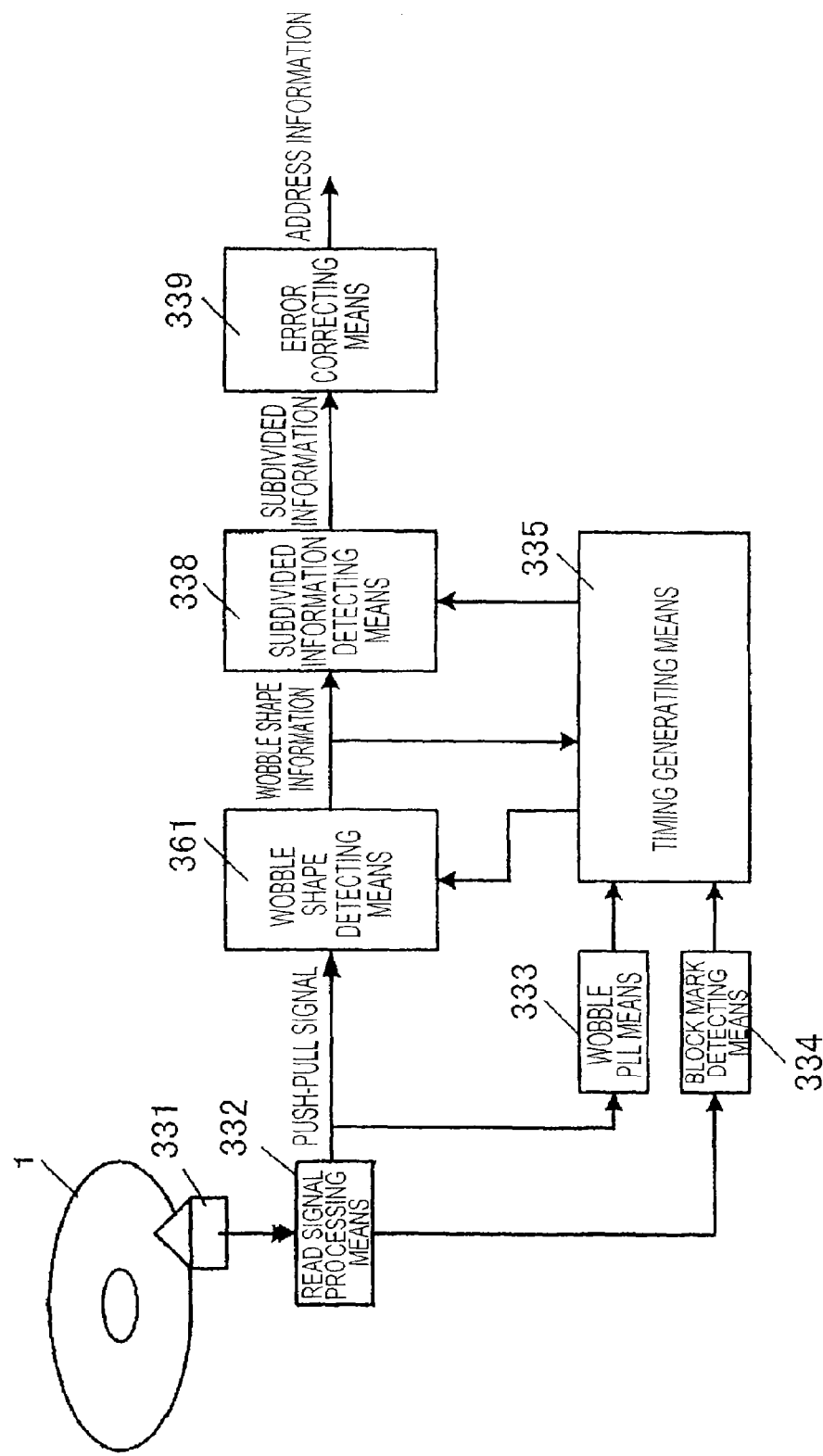
FIG. 8 illustrates a configuration for an optical disk reproducing apparatus according to a fifth preferred embodiment of the present invention.

Another optical disk reproducing apparatus for reading an address on an optical disk according to the present invention will be described with reference to FIG. 8.

Figure 5:
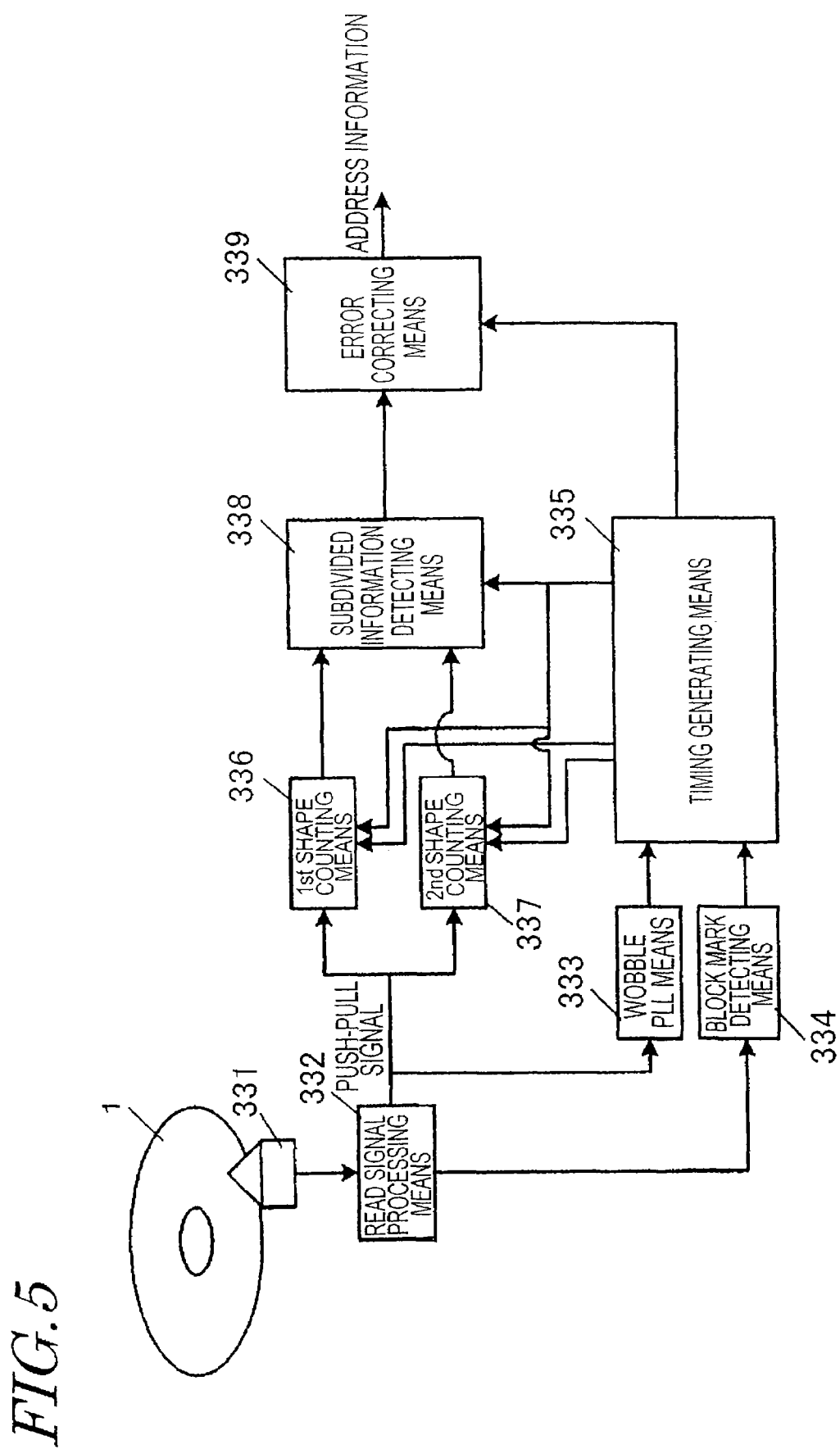
FIG. 5 illustrates a configuration for an optical disk reproducing apparatus according to a second preferred embodiment of the present invention.

The reproducing apparatus of this preferred embodiment is different from the counterpart shown in FIG. 5 in that the apparatus of this preferred embodiment includes a wobble shape detector 361. The wobble shape detector 361 identifies a given wobble shape as a first shape with a steep rising displacement or as a second shape with a steep falling displacement on a wobble period basis, thereby outputting wobble shape information to the subdivided information detector 338. In accordance with the wobble shape information obtained from the wobble shape detector 361, the subdivided information detector 338 determines which shape has been detected the greater number of times, the first shape or the second shape. Then, the detector 338 identifies and outputs the subdivided information allocated to a given subdivided information unit.

The subdivided information detector 338 may include: a counter for obtaining the number of times that a signal indicating the detection of the first shape has been received in accordance with the wobble shape information received; and another counter for obtaining the number of times that a signal indicating the detection of the second shape has been received in accordance with that information. By comparing the counts of these two shapes with each other, a decision by majority may be made. Alternatively, an up/down counter may also be used to increment the count by one when the first shape is detected and to decrement the count by one when the second shape is detected. In that case, the subdivided information may be represented by the sign of the count of the up/down counter, i.e., seeing whether the count of the up/down counter is positive or negative, at the end of a given unit section.

Figure 9:
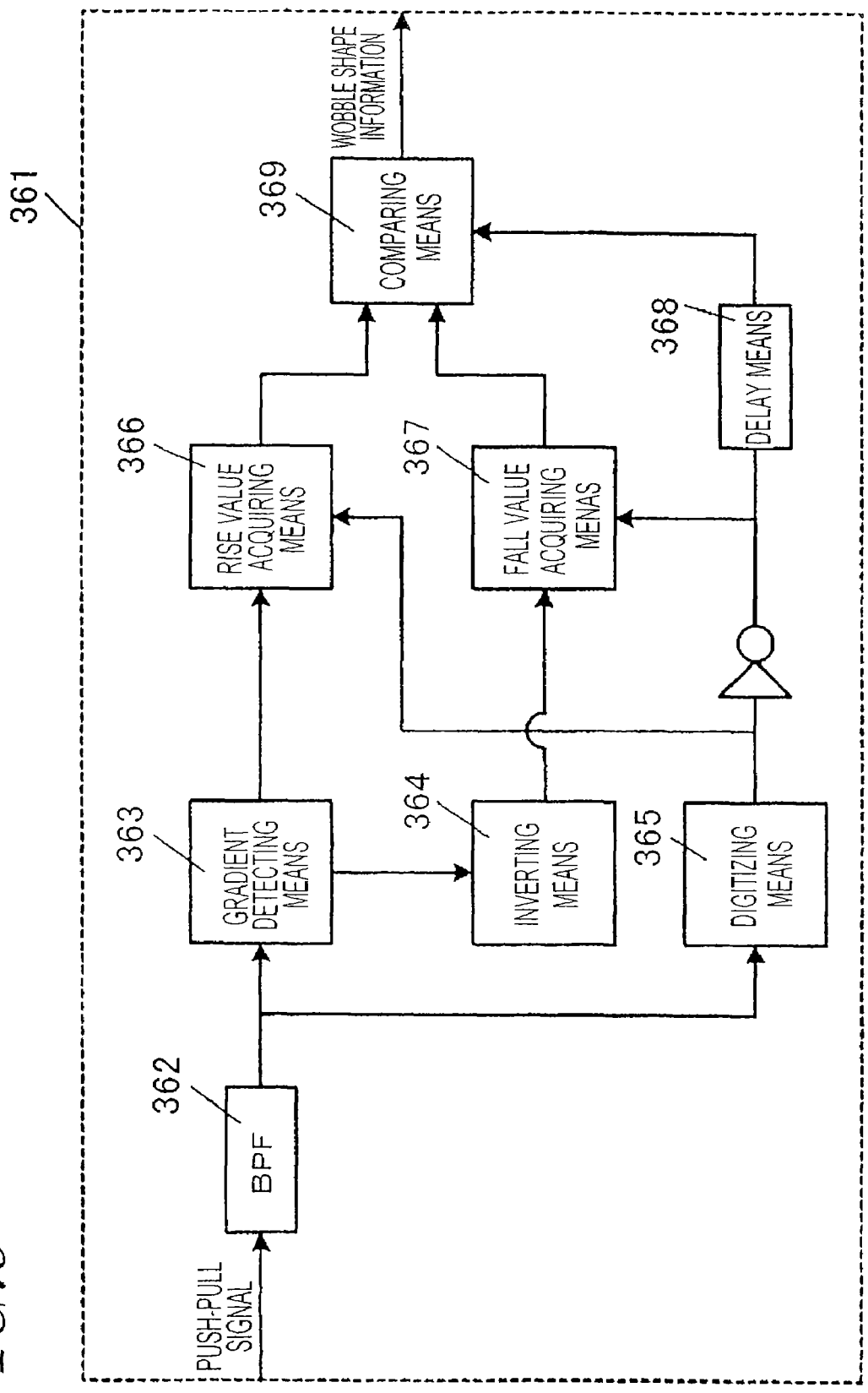
FIG. 9 illustrates a detailed configuration for the wobble shape detector shown in FIG. 8.

Next, it will be described in detail with reference to FIG. 9 how the wobble shape detector 361 operates.

The wobble shape detector 361 includes a bandpass filter (BPF) 362, which receives the push-pull signal (i.e., the wobble signal) and reduces unwanted noise components thereof. This BPF 362 may pass the fundamental (basic) frequency components of the wobble signal and harmonic frequency components including wobble gradient information. Supposing the wobble signal has a basic frequency of fw, a bandpass filter having a band ranging from ½ fw to 5 fw is preferably used to allow a good margin for possible variation in linear velocity.

The output of the BPF 362 is input to a gradient detector 363 and a digitizer 365.

The gradient detector 363 detects the gradient of the wobble signal. This "gradient" detection may be carried out by differentiating the wobble signal. Instead of the differentiator, a high-pass filter (HPF) for extracting only harmonic components including gradient information may also be used. The output of the gradient detector 363 is delivered to a rise value acquirer 366 and an inverter 364.

The inverter 364 inverts the output of the gradient detector 363 with respect to the zero level and then outputs the inverted value to a fall value acquirer 367.

The digitizer 365 detects rising and falling zero-cross timings of the wobble signal. The "rising zero-cross timing" herein means a time at which the wobble signal changes from "L" level into "H" level. On the other hand, the "falling zero-cross timing" herein means a time at which the wobble signal changes from "H" level into "L" level.

The rise value acquirer 366 samples and holds the gradient of the wobble signal, i.e., the output of the gradient detector 363, at the rising zero-cross timing that has been detected by the digitizer 365. In the same way, the fall value acquirer 367 samples and holds the inverted gradient of the wobble signal, i.e., the output of the inverter 364, at the falling zero-cross timing that has been detected by the digitizer 365.

In this case, the value sampled by the rise value acquirer 366 is a positive value because this value represents the gradient of a rising edge. The value sampled by the fall value acquirer 367 is also a positive value because this value represents the inverted gradient of a falling edge. That is to say, the values sampled by the rise and fall value acquirers 366 and 367 correspond to the absolute values of the respective gradients.

A comparator 369 compares the absolute value of the rising edge gradient as sampled and held by the rise value acquirer 366 to the absolute value of the falling edge gradient as sampled and held by the fall value acquirer 367 after a predetermined time has passed since the falling zero-cross timing of the wobble signal. This predetermined amount of time delay is caused by a delay circuit 368. If the value of the rise value acquirer 366 is found the greater, the comparator 369 outputs wobble shape information indicating the first shape. Otherwise, the comparator 369 outputs wobble shape information indicating the second shape. That is to say, by comparing only the gradients at the rising and falling zero-cross timings, at which the wobble signal gradient information is most reliable (i.e., the differentiated values thereof will be the maximum and minimum, respectively), to each other, the wobble shape is detectable accurately enough.

In this preferred embodiment, the same signal is input to both the digitizer 365 and the gradient detector 363. However, the present invention is not limited to this particular preferred embodiment. To detect the zero-cross timings of the wobble signal even more accurately, the output of the BPF 362 may be input to the digitizer 365 by way of a low-pass filter (LPF). Also, the BPF 362 may be replaced with two types of BPFs with mutually different characteristics that are provided for the gradient detector 363 and the digitizer 365, respectively. In that case, to match the phases of the wobble signal that has been passed through these BPFs, a delay corrector is preferably further provided separately.

As described above, in the optical disk reproducing apparatus of this preferred embodiment, the gradients of a wobble signal including subdivided information are sampled and held at zero-cross timings of the wobble signal and then the values held are compared to each other. In this manner, the wobble shape is identifiable accurately enough and detection errors of subdivided information as caused by noise, for example, are reducible.

Embodiment 6

Figure 10:
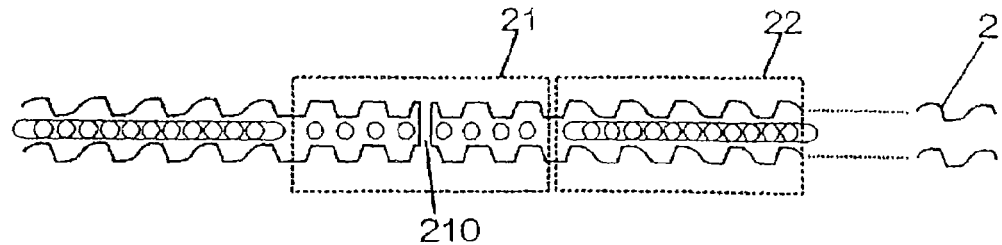
FIG. 10 illustrates a main portion of an optical disk medium according to a sixth preferred embodiment of the present invention.

FIG. 10 illustrates a configuration in which a block mark 210 is located approximately at the center of a VFO recording area 21. In the example illustrated in FIG. 10, a wobble having a rectangular waveform has been formed in the VFO recording area 21. However, the present invention is not limited to this particular preferred embodiment.

Figure 11A:
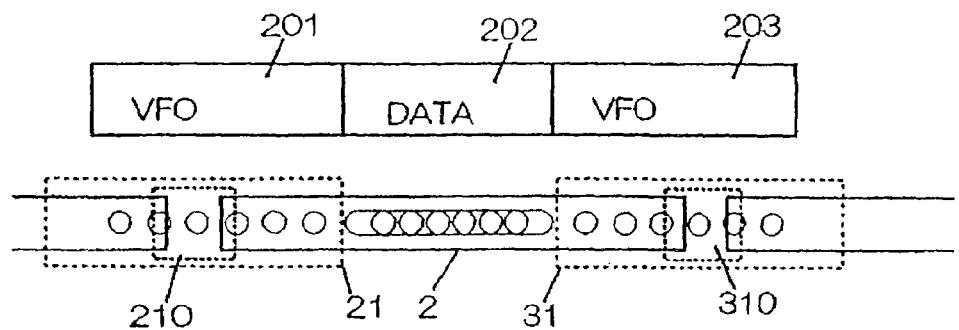
FIGS. 11A and 11B illustrate a method for writing a signal on a VFO recording area 21.
Figure 11B:
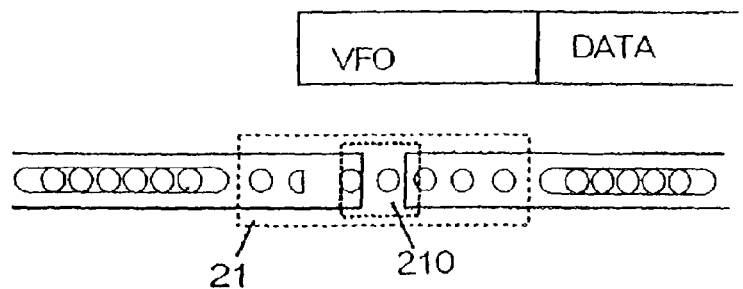

Hereinafter, it will be described with reference to FIGS. 11A and 11B how to write a signal on the VFO recording area 21. In FIGS. 11A and 11B, the wobble formed on the track groove 2 is omitted for the sake of simplicity.

FIG. 11A illustrates a situation where a signal corresponding to one block is written on the track groove 2. A recording signal for one block includes data (DATA) 202 and VFOs 201 and 203.

Writing on each block begins with the VFO 201. In this preferred embodiment, the VFO 201 is written within the VFO recording area 21 and the writing start point of the VFO 201 is ahead of the block mark 210. After the VFO 201 has been written, the DATA 202 for one block is written and then the VFO 203 is written finally. The VFO 203 is written within the VFO recording area 31 and the writing end point of the VFO 203 is behind the block mark 310. That is to say, in this preferred embodiment, information starts to be recorded before the block mark, located at the beginning of an intended recording area, is reached, and then finishes being recorded after the block mark, located at the end of the intended recording area, has been passed.

If data starts to be written at the center of the block mark 210, then the recording film deteriorates considerably at its part where the block mark 210 is present. The block mark 210 of this preferred embodiment is formed by discontinuing the track groove 2 for just a short length. Accordingly, steps have been formed on the track groove where the block mark 210 is present. In recording information on those stepped parts, the information needs to be recorded on the recording film by irradiating those parts of the recording film with a high-energy laser beam so that the irradiated parts will be given a high thermal energy. In this case, steep temperature gradients are formed before and after those parts irradiated with the laser beam. These temperature gradients produce a stress in the recording film. If any of the steps exists in the stressed part, then a small crack might be formed in the recording film. Once that small crack has been formed in the recording film, the crack will expand every time the write operation is repeatedly carried out. Then, the film might be broken in the end.

In this preferred embodiment, to prevent such film breakage, the writing start and end points are defined in the areas where no block marks 210 or 301 are present.

The VFO is a dummy signal for preparing for data reading. While the VFO signal is being read, the slice level of the data is feedback-controlled at the center of the read signal and the PLL is locked to extract a clock signal. To read data with high fidelity, the read data signal needs to be digitized and clocked accurately enough. If a VFO signal interval is too short, then the data starts to be read before the PLL has been locked sufficiently, thus possibly causing errors in the data that has been read out from the beginning of a block. Accordingly, the VFO preferably starts to be written ahead of the block mark and is preferably provided with a sufficiently long area.

It should be noted that if data has already been written on the previous block, then a VFO for the current block to be written might be overwritten on a VFO for the previous block as shown in FIG. 11B. In that case, part of the VFO signal already written is erased. Also, the preexistent VFO may not be in phase with the overwritten VFO. Accordingly, it is not preferable to get the PLL locked for the current block by using the VFO of the previous block.

The foregoing description of this preferred embodiment relates to the VFO writing start point. Similar recording film deterioration is also observed around the data writing end point. However, the writing end point is preferably behind the block mark 310, not before. If the writing end point was located ahead of the block mark 310, then a gap might be formed between the current block and the following block. This gap is an area that is not irradiated with the high-power light and in which no marks are formed. Just like the steps, such a gap might contribute to the film deterioration. Accordingly, the VFO at the end of the previously written block preferably overlaps with the VFO at the beginning of the current block to be written. This VFO overlap is achieved by setting the VFO writing start point ahead of the block mark 210 and the VFO writing end point behind the block mark 310, respectively, as shown in FIG. 11A.

The distance between the block mark and the VFO writing start or end point is preferably about 10 times or more as long as the beam spot size of the laser light for writing. A beam spot size is obtained by dividing the wavelength of laser light by an NA value. Accordingly, when an optical head, which emits laser light having a wavelength of 650 nm and has an NA of 0.65, is used, the size of a beam spot formed on a disk is 1 μm (=wavelength/NA). In that case, the writing start or end point is preferably 10 μm or more distant from the block mark. However, that reference distance obtained by multiplying the beam spot size by ten may be correctible depending on the properties (e.g., thermal conductivity, in particular) of the recording film.

It should be noted, however, that when the write operation is started ahead of the block mark 210, the block mark 210 has not been detected yet. Accordingly, to start writing before the block mark just as intended, the location of the block mark should be predicted or estimated in some way or other. For example, after the block mark of the previous block has been detected, the number of clock pulses of the clock signal may be counted. And when the count reaches a predetermined number, the VFO may start to be written for the next block.

Embodiment 7

Figure 12:
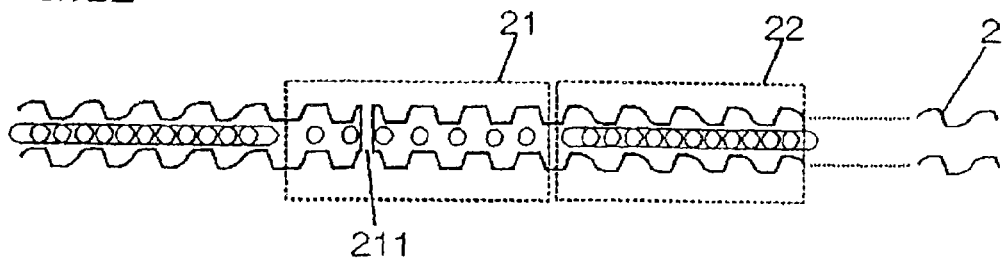
FIG. 12 illustrates a main portion of an optical disk medium according to a seventh preferred embodiment of the present invention.

An optical disk medium according to a seventh preferred embodiment of the present invention will be described with reference to FIG. 12. In the sixth preferred embodiment described above, the block mark 210 is located approximately at the center of the VFO recording area 21. On the other hand, according to this preferred embodiment, a block mark 211 is located closer to the previous block with respect to the center of the VFO recording area 21 as shown in FIG. 12. In such a configuration, the VFO may be longer at the beginning.

Embodiment 8

Figure 13:
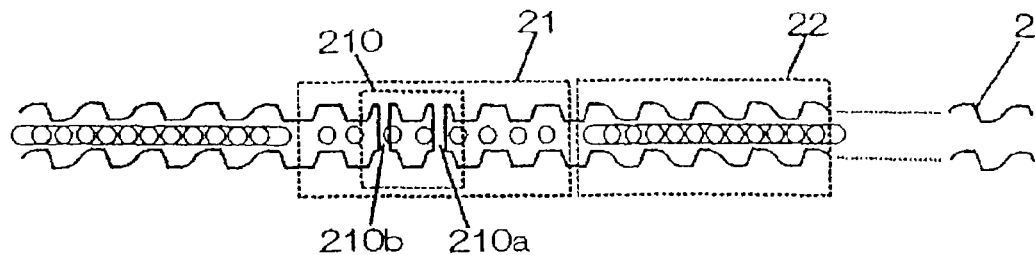
FIG. 13 illustrates a main portion of an optical disk medium according to an eighth preferred embodiment of the present invention.
Figure 14A:
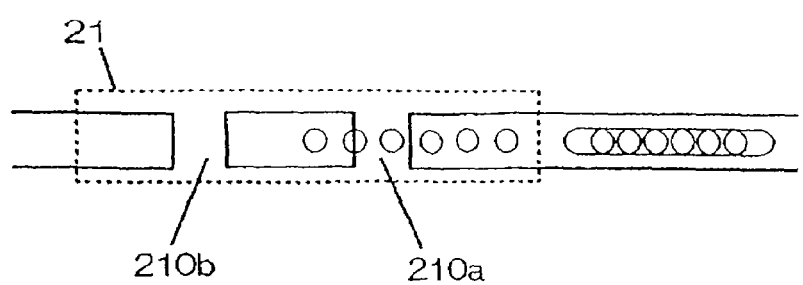
FIGS. 14A and 14B illustrate a signal writing method according to the eighth preferred embodiment.
Figure 14B:
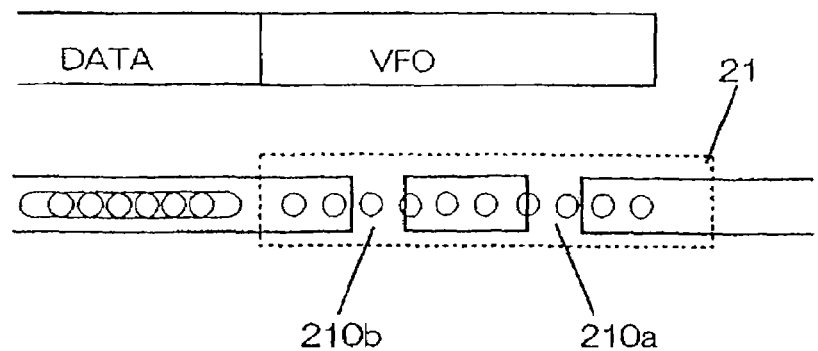

An optical disk medium according to an eighth preferred embodiment of the present invention will be described with reference to FIGS. 13, 14A and 14B.

The block mark 210 of this preferred embodiment is made up of two sub-marks 210a and 210b. According to this configuration, the write operation can be timed more easily. That is to say, since two marks have been formed, the write operation may be started after the mark 210b at the beginning of a block has been detected and before the mark 210*a* is detected. Also, the write operation may be ended after the second mark 210*a*, located at the beginning of the next block, has been detected.

In this manner, the writing start point can be defined accurately enough without counting the number of clock pulses after the block mark of the previous block has been detected.

It should be noted that to avoid the film deterioration, the space between these marks 210*a* and 210*b* is preferably sufficiently wide. Specifically, to make the distance between the writing start point and the mark 210*a* or 210*b* about 10 times or more as long as the beam spot size, the space between the marks 210*a* and 210*b* is preferably about 20 times or more as long as the beam spot size. For example, where the size of a beam spot formed on an optical disk is 1 µm, this space is preferably 20 µm or more.

Embodiment 9

An optical disk according to a ninth preferred embodiment of the present invention will be described with reference to FIG. 15. In each of the sixth, seventh and eighth preferred embodiments described above, the block mark 210 is formed by discontinuing the track groove 2 for just a short length. In such a part where the track groove is discontinued, no groove exists. Accordingly, that part is flat and is called a "mirror mark". A mirror mark reflects read light at a high reflectance and is easily detectable. In this preferred embodiment, however, the block mark is not formed as a mirror mark but a block mark 218 in a different shape is adopted. Hereinafter, this block mark 218 will be described in detail.

Figure 15:
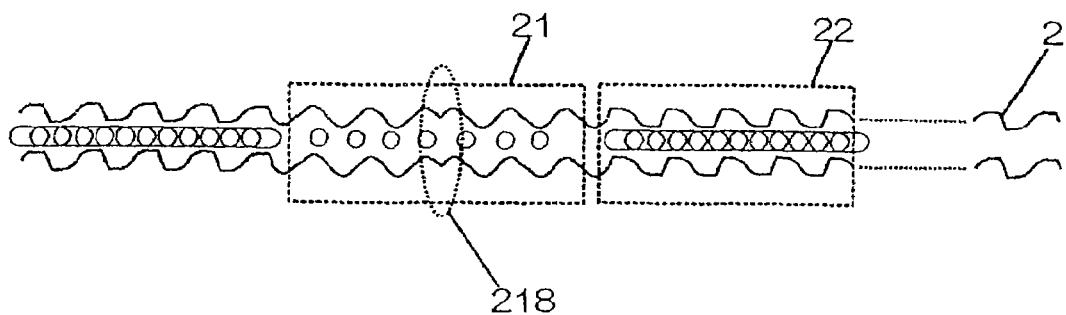
FIG. 15 illustrates a main portion of an optical disk medium according to a ninth preferred embodiment of the present invention.

In this preferred embodiment, the wobble phase of the track groove is partially inverted inside the VFO recording area 21 and this part with the inverted phase is used as the block mark 218 as shown in FIG. 15.

As described above, the block mark 210 as a mirror mark advantageously ensures high positioning accuracy and is easily detectable. However, if the SN ratio is low, then detection errors increase considerably. In contrast, if the track groove is formed in such a manner that the wobble phase before the block mark 218 is the inverse of the wobble phase after the block mark 218, the passage of the block mark 218 may be sensed at any time by observing the wobble phase after the block mark 218 has been passed. This passage is sensible even if the wobble phase change point (i.e., the block mark 218) itself could not be located due to noise, for example.

Embodiment 10

Figure 16:
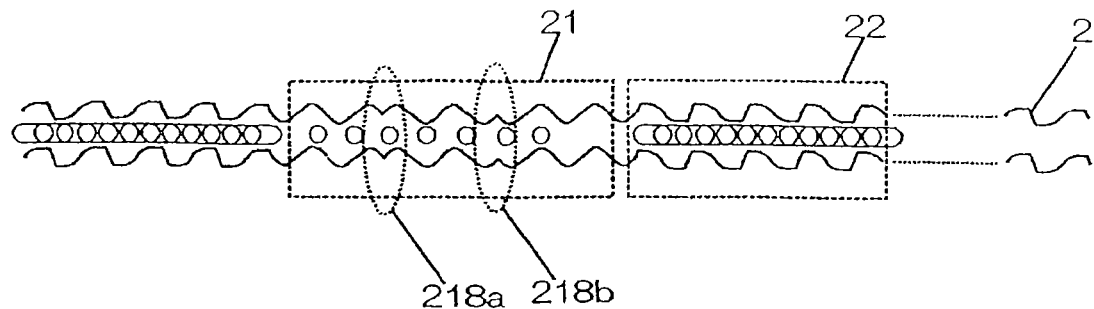
FIG. 16 illustrates a main portion of an optical disk medium according to a tenth preferred embodiment of the present invention.

Another preferred embodiment of the inventive optical disk will be described with reference to FIG. 16. In this preferred embodiment, two block marks 218*a* and 218*b* are provided inside each VFO recording area 21. Each of these block marks 218*a* and 218*b* is formed by inverting the wobble phase of the track groove.

The main difference between this preferred embodiment and the preferred embodiment illustrated in FIG. 15 is whether the wobble phase is inverted between a pair of blocks an odd number of times or an even number of times. As shown in FIG. 15, where the wobble phase is inverted just once (i.e., an odd number of times) within each VFO recording area 21, the wobble phase will be kept inverted to that of the previous block since the phase has been inverted and until the next block mark is passed. As a result, if a clock signal is extracted as it is from the wobble of the track groove by a PLL synchronization technique, then the output of the phase comparator of the PLL will have its polarity inverted and the PLL will slip disadvantageously. For that reason, if the wobble phase is inverted an odd number of times as in the example illustrated in FIG. 15, the polarity of the PLL needs to be inverted after the block mark has been passed.

In contrast, according to this preferred embodiment, the phase that has been once inverted (at the block mark 218*a*) is inverted again (at the block mark 218*b*). Thus, the wobble phase becomes the same as that of the previous block. Accordingly, there is no need to invert the polarity of the PLL.

In each VFO recording area 21, the interval between the block marks 218*a* and 218*b* needs to be longer than expected defect noise. However, if this interval is longer than the response time of the PLL, the probability of occurrence of the slip increases. In view of these considerations, the interval between the block marks 218*a* and 218*b* within each VFO recording area 21 is preferably about three to about ten times as long as the wobble frequency.

It should be noted that the number of the block marks 218*a*, 218*b* inside each VFO recording area 21 is not limited to two but may be another even number to achieve effects similar to those of this preferred embodiment. However, more than four block marks 218*a*, 218*b* should not be formed within a limited length in view of the density of integration.

In the ninth and tenth preferred embodiments described above, the block marks are formed by inverting the wobble phase. However, as long as the phase difference is detectable, the phases before and after the block mark do not have to be shifted from each other by 90 degrees precise. The shift in wobble phase at the block mark is preferably from 45 degrees to 135 degrees, for example.

Embodiment 11

Figure 17:
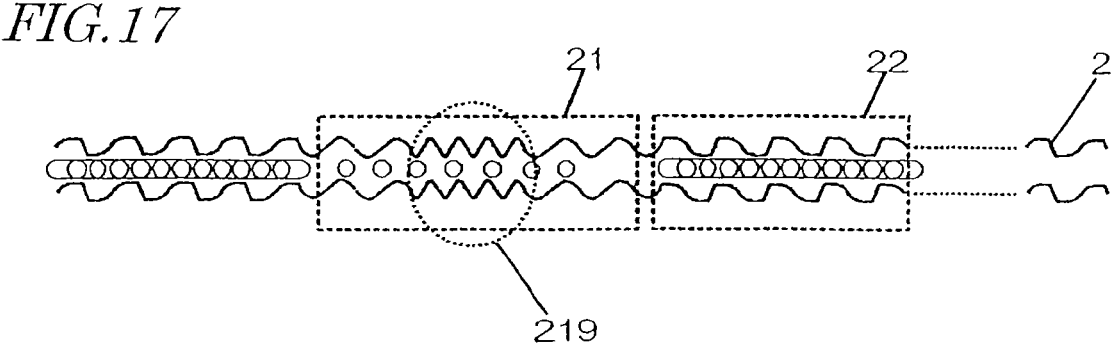
FIG. 17 illustrates a main portion of an optical disk medium according to an eleventh preferred embodiment of the present invention.

Next, an eleventh preferred embodiment of the present invention will be described with reference to FIG. 17.

This preferred embodiment is different from the sixth through tenth preferred embodiments described above in the configuration of the block mark 219. Specifically, the block mark 219 of this preferred embodiment is defined by a wobble having a frequency different from the wobble frequency of the groove located inside the block. In the example illustrated in FIG. 17, the wobble frequency of the block mark 219 is higher than that inside the block. Accordingly, if part of a read signal, which has a locally different wobble frequency, is separated or identified by processing the read signal using a band pass filter, for example, then the block mark 219 can be located highly accurately.

In the optical disk medium of this preferred embodiment, the block mark 219 is also formed inside the VFO recording area 21, and VFO data is also written on the area where the block mark 219 is present.

The wobble frequency of the block mark 219 is preferably defined 1.2 to 3.0 times as high as, more preferably 1.5 to 2.0 times as high as, the wobble frequency inside the block. The reason is as follows. Specifically, if the wobble frequency of the block mark 219 is too close to that inside the block, then it is hard to detect the block mark 219. On the other hand, if the wobble frequency of the block mark 219 is too much higher than that inside the block, then the former wobble frequency will get closer to the signal frequency of the information to be written on the recording film. As a result, these signals will interfere with each other disadvantageously.

It should be noted that in the space between a pair of blocks, a wobble having the same frequency as the wobble frequency inside the blocks is preferably formed except the area of the block mark 219. In the block-to-block space, however, the wobble shape is preferably different from the wobble shape inside the blocks. In the example illustrated in FIG. 17, the block-to-block groove wobbles in a sine wave curve.

Embodiment 12

Figure 18:
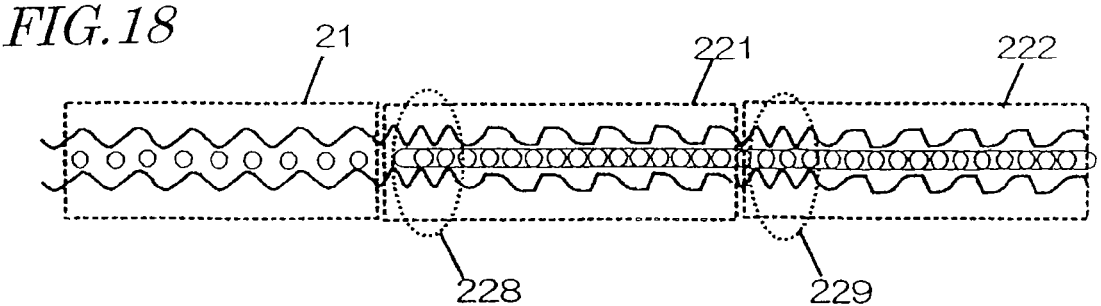
FIG. 18 illustrates a main portion of an optical disk medium according to a twelfth preferred embodiment of the present invention.

Next, a twelfth preferred embodiment of the present invention will be described with reference to FIG. 18.

In this preferred embodiment, no shape that has its amplitude, frequency or phase changed locally is used as the block mark, but a groove itself wobbling in a sine wave curve is used as the block mark. Also, the beginning of each sub-block 221 or 222 includes a wobble 228 or 229 with a locally changed frequency.

By defining such an area having a wobble frequency different from the fundamental wobble frequency at the beginning of each sub-block in this manner, the boundary between the sub-blocks is detectable correctly. In the preferred embodiments described above, a sub-block is located by counting the number of wobbles from the block mark. On the other hand, in this preferred embodiment, a sub-block can be located by detecting the sub-block marks 228, 229 provided for the respective sub-blocks.

It should be noted that a block mark similar to the counterpart of any of the preferred embodiments described above may be formed at an appropriate position inside the VFO recording area 21. Also, in this preferred embodiment, the sub-block mark 228, 229 having a locally different wobble frequency is formed at the beginning of each sub-block 221, 222. Alternatively, the sub-block mark 228, 229 may be located at the end of each sub-block. Also, the sub-block marks 228, 229 do not have to be provided for all sub-blocks but may be provided for only odd-numbered or even-numbered sub-blocks.

Because of the same reasons as those described above, the wobble frequency of the sub-block marks 228, 229 is preferably defined 1.2 to 3.0 times as high as, more preferably 1.5 to 2.0 times as high as, that of the other parts.

The sub-block marks 228, 229 are preferably used to indicate the beginning of their sub-blocks but may represent any other type of information. For example, multiple sub-block marks included in a block may represent either the address of the block or that of any other associated block. Or any other type of information may be recorded by using the sub-block marks. When the address of a block is recorded by using a plurality of sub-block marks, the same address information as that formed by the shape of wobbles is recorded additionally in the same block. Thus, the address can be read much more reliably.

In recording multi-bit information as a combination of these sub-block marks, the sub-block marks should have mutually different and identifiable shapes corresponding to two or more values. For this purpose, the wobbles of those sub-block marks may be given mutually different frequencies or may be subjected to mutually different types of phase modulation.

Next, a circuit configuration for generating a clock signal and reading address information from an optical disk medium according to a preferred embodiment of the present invention will be described with reference to FIG. 19.

First, a photodetector 371 that has been divided in a direction vertical to the tracking direction (i.e., in the disk radial direction) and a differential amplifier 372 are used to generate an electric signal including signal components corresponding to the wobble of the groove. Next, a low-pass filter (LPF) 374 extracts only the fundamental period components of a wobble signal from this read signal. The signal consisting of the fundamental period components is supplied to a clock generator 373. The clock generator 373 may be implemented as a PLL circuit, for example, and multiplies the fundamental period signal received by a predetermined number, thereby generating a clock signal for use in read/write signal synchronization processing.

On the other hand, a high-pass filter (HPF) 375 selectively passes the harmonic components included in the read wobble signal. The output of the high-pass filter 375 includes: high frequency components corresponding to the sub-block marks 228 and 229 shown in FIG. 18; and steep edge components of a saw-tooth like signal representing a saw-tooth like wobble.

A sub-block mark detector 377 detects the wobble components having a predetermined frequency and corresponding to the sub-block marks 228 and 229. On detecting these marks 228 and 229, the detector 377 generates a timing signal. The timing signal is output from the sub-block mark detector 377 to an address decoder 378.

As described above, a steep edge of a saw-tooth like wobble has its polarity inverted depending on whether it represents "1" or "0" of address information. In accordance with the output of the high-pass filter 375, an address information detector 376 detects this polarity inversion and sends out a bit stream to the address decoder 378. On receiving this bit stream, the address decoder 378 decodes the address information in response to the timing signal that has been output from the sub-block mark detector 377.

In the preferred embodiments described above, an identification mark, on which signals can be overwritten, is formed for each block and an address is represented by the wobble of the groove. As a result, an optical disk medium, on which information can be stored on a block-by-block basis and which is suitably applicable to high-density recording, is provided. Also, by starting or ending a write operation at a position sufficiently distant from this identification mark, the deterioration of the recording film is reducible.

Embodiment 13

Hereinafter, a thirteenth preferred embodiment of the present invention will be described with reference to FIGS. 20 through 25.

Figure 20:
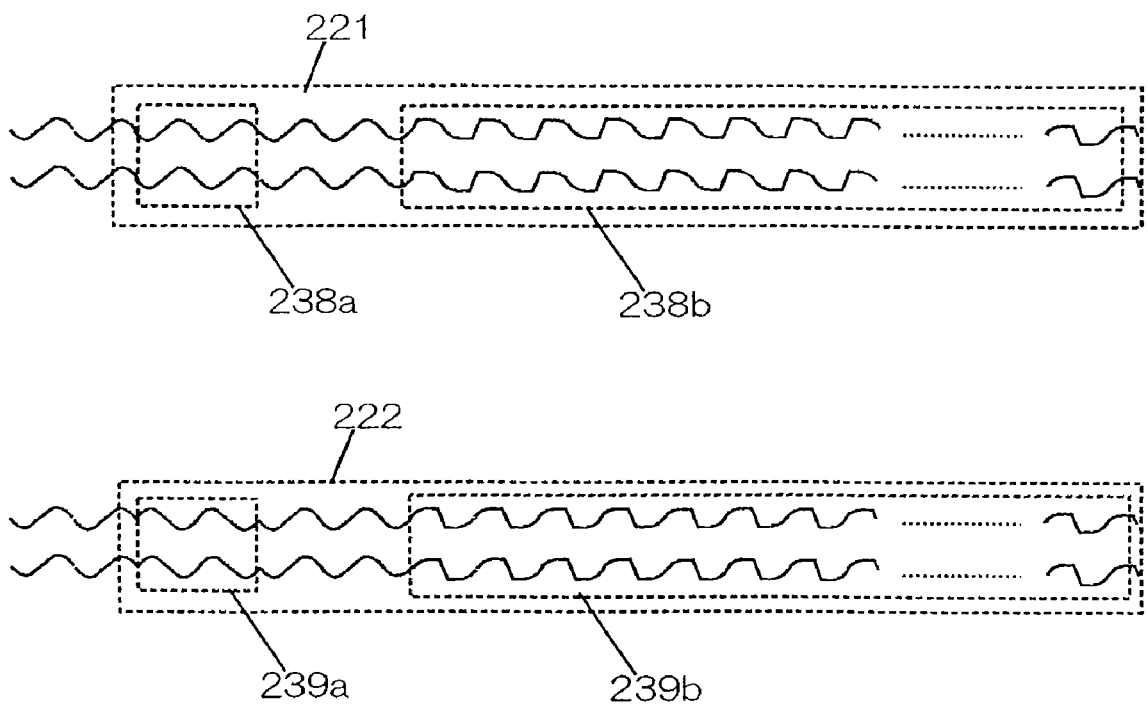
FIG. 20 illustrates main portions of an optical disk medium according to a thirteenth preferred embodiment of the present invention.

In this preferred embodiment, a sub-block mark 238a or 239a, including phase information, is provided for a portion of each sub-block 221 or 222 as shown in FIG. 20. As already described for the twelfth preferred embodiment, the sub-block mark 238a or 239a does not have to be provided just for the purpose of indicating the beginning of its associated sub-block 221 or 222. For example, to increase the reliability of address information to be read out from the sub-block 221 or 222, the same address information may be represented not only by the wobble 238b or 239b but also by the sub-block mark 238a or 239a within the same sub-block 221 or 222.

In this preferred embodiment, the sub-block mark 238a that has been formed in the sub-block 221 has a wobbled shape having a non-inverted phase. This shape corresponds to address information "1" as the wobble 238b of the same sub-block 221 does. On the other hand, the sub-block mark 239a that has been formed in the sub-block 222 has a wobbled shape having an inverted phase. This shape corresponds to address information "0" as the wobble 239b of the same sub-block 222 does.

By sensing whether each of these sub-block marks 238a and 239a is in phase or out of phase with a PLL clock signal, supplementary address information can be obtained.

Figure 23:
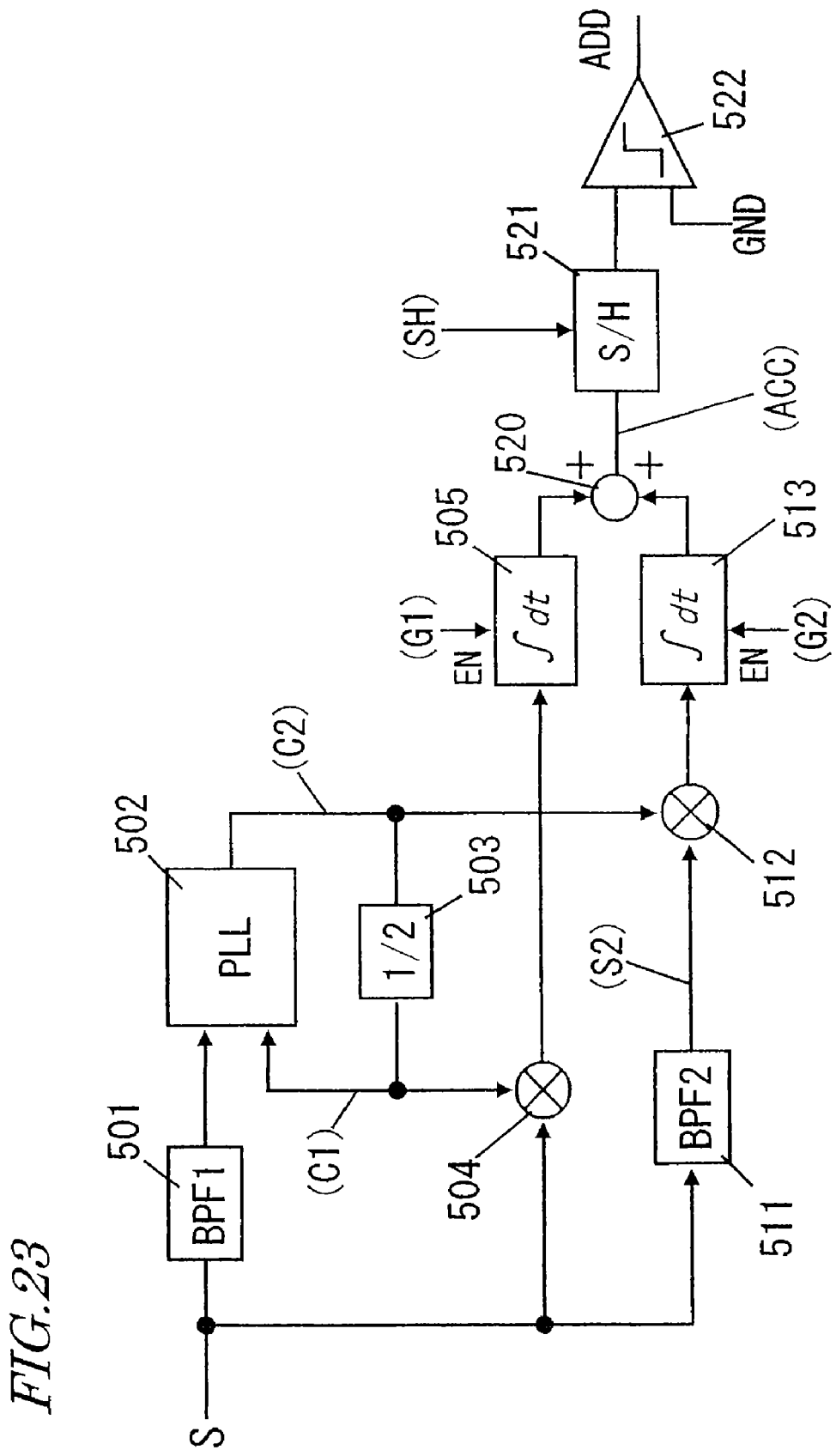
FIG. 23 illustrates a configuration for an apparatus for reading address information from the optical disk medium of the thirteenth preferred embodiment.

The phase of the sub-block mark 238a or 239a may be detected by a circuit such as that shown in FIG. 23 that utilizes a heterodyne detection technique.

Hereinafter, a phase detection method according to the thirteenth preferred embodiment of the present invention will be described with reference to FIGS. 21 through 25.

Figure 19:
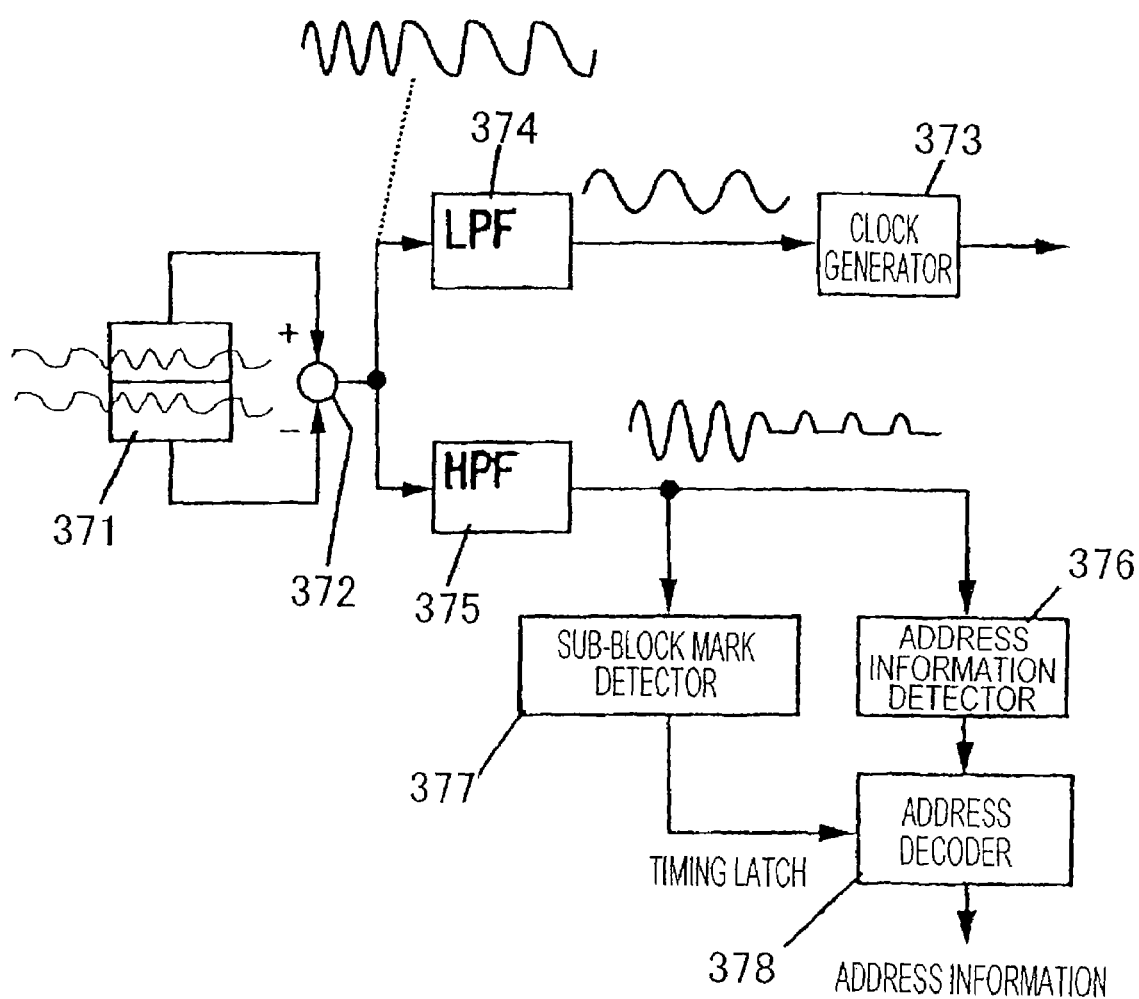
FIG. 19 illustrates a configuration for an apparatus for generating a clock signal and reading an address signal from the optical disk medium of the twelfth preferred embodiment.

Suppose a read signal S is the output signal of the differential amplifier 372 shown in FIG. 19, for example. As shown in FIG. 23, the read signal S is input to BPF1 501, BPF2 511 and multiplier 504. The BPF1 501 extracts a wobble basic frequency signal from the read signal S and then outputs it to a PLL 502. In response, the PLL 502 generates a carrier signal (i.e., first sync signal) C1 and outputs it to the multiplier 504. The carrier signal C1 is synchronized with the wobble basic frequency signal and has a frequency equal to the wobble basic frequency.

Figure 21:
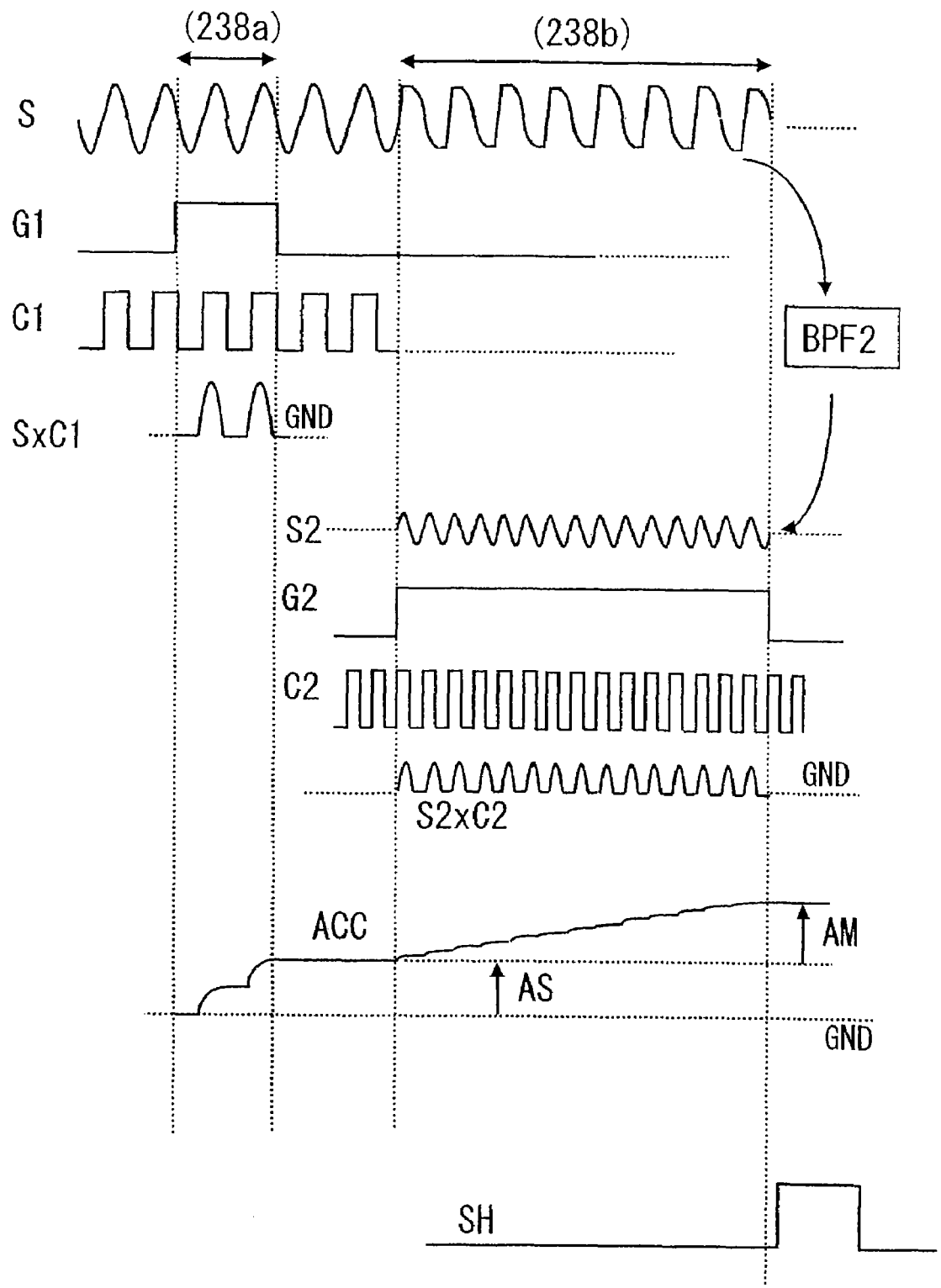
FIG. 21 illustrates how an address may be detected in the thirteenth preferred embodiment.
Figure 22:
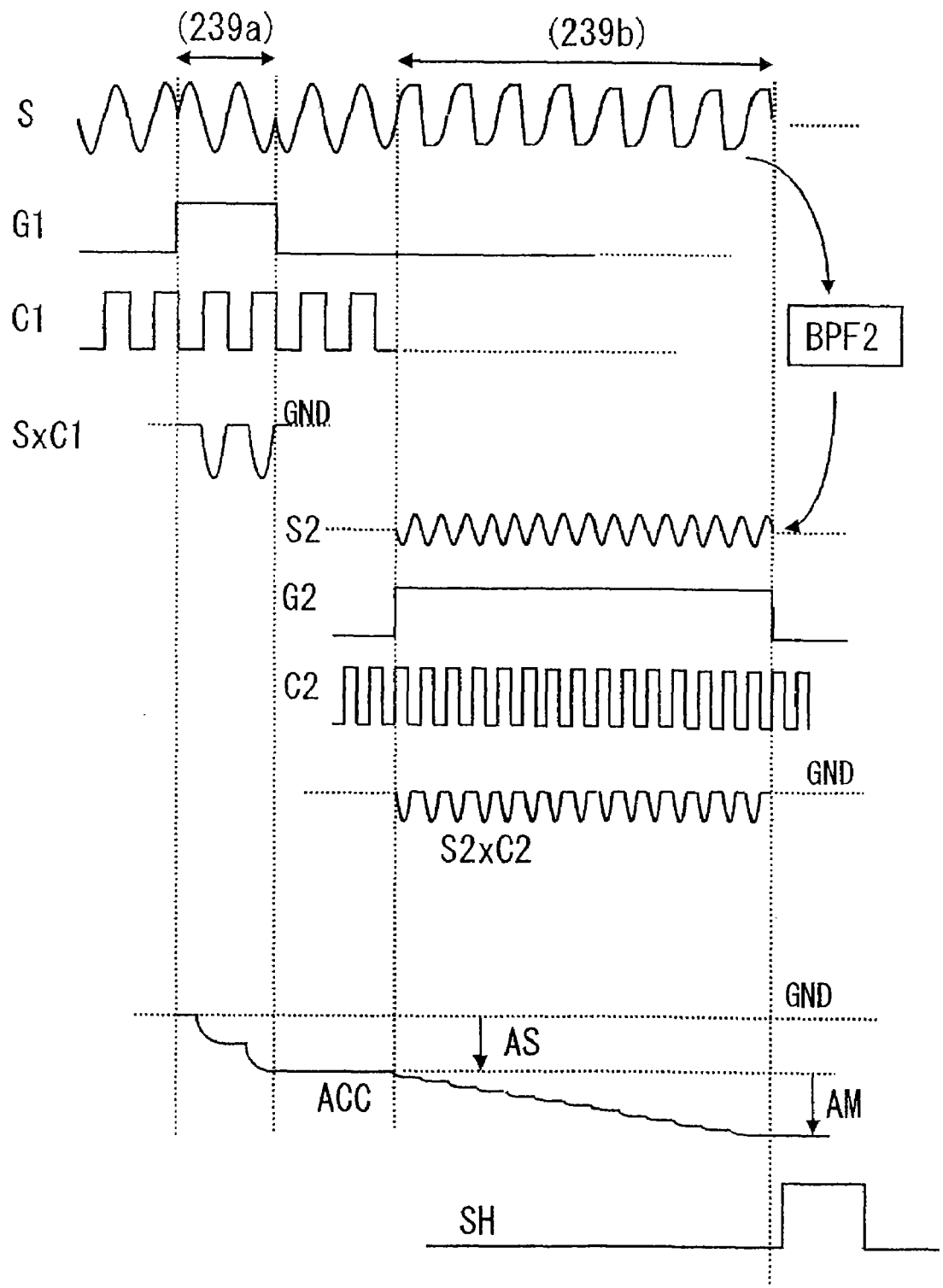
FIG. 22 illustrates how an address may be detected in the thirteenth preferred embodiment.

When this carrier signal C1 and the read signal S are multiplied together by the multiplier 504, a multiplied signal can be obtained. As shown in FIGS. 21 and 22, the polarity of the multiplied signal may be either positive or negative depending on whether the supplementary address information represented by the sub-block mark 238a or 239a is "1" or "0".

FIG. 21 is a timing chart showing a situation where the supplementary address information represented by the sub-block mark 238a is "1", while FIG. 22 is a timing chart showing a situation where the supplementary address information represented by the sub-block mark 239a is "0". In FIGS. 21 and 22, the multiplied signal is identified by S×C1.

Next, it will be described in further detail with reference to FIG. 24 how the multiplied signal S×C1 is generated. Two types of read signals S having mutually inverse phases are shown in portion (a) of FIG. 24. A first read signal S is indicated by the solid curve, while a second read signal S, of which the phase is shifted from that of the first read signal S by 180 degrees, is indicated by the dashed curve.

As can be seen from portions (a) and (b) of FIG. 24, the carrier signal C1 has been generated so as to be synchronized with, and have the same frequency as, the read signals S. As shown in portion (b) of FIG. 24, the carrier signal C1 has a waveform that alternates between a zero voltage level "0" and a positive voltage level "1". Accordingly, the product S×C1 of the first read signal S indicated by the solid curve in portion (a) of FIG. 24 and the carrier signal C1 shown in portion (b) of FIG. 24 has a waveform indicated by the solid curve shown in portion (c) of FIG. 24. On the other hand, the product S×C1 of the second read signal S indicated by the dashed curve in portion (a) of FIG. 24 and the carrier signal C1 shown in portion (b) of FIG. 24 has a waveform indicated by the dashed curve shown in portion (c) of FIG. 24. In this manner, the multiplied signal S×C1 has its polarity determined by one of the two types of phases of the first and second read signals S.

When this multiplied signal S×C1 is integrated for a predetermined period of time by the integrator 505 shown in FIG. 23, the products S×C1 will be accumulated in the positive or negative domain to produce the integrated signal ACC shown in FIG. 21 or 22. The "predetermined period" corresponds to an interval in which that portion of the sub-block including the sub-block mark 238a or 239a is scanned by the read laser beam. In this interval, a gate signal G1 is generated to enable the processing performed by the integrator 505 as shown in FIG. 21. In other words, the integration operation is started on the leading edge of the gate signal G1 and ended on the trailing edge of the gate signal G1.

The gate signal G1 may be generated in the following manner. Specifically, the number of wobbles may be counted one by one from one of the block marks 218a and 218b shown in FIG. 16, for example. And the gate signal G1 may be generated at a time when the beam spot is expected to pass the sub-block mark. It should be noted that any other type of block mark may be used instead of the block marks 218a and 218b shown in FIG. 16.

The information represented by the wobble 238b or 239b may also be detected by a similar method. Suppose the BPF2 511 shown in FIG. 23 is a filter with a transmission band having a center frequency that is twice as high as the wobble basic frequency of the read signals S. In that case, the BPF2 511 extracts a second harmonic signal S2, constituting the sawtooth wave, from the read signal S corresponding to the sawtooth wobble 238b or 239b as shown in FIGS. 21 and 22. In addition, the phase polarity of the second harmonic signal S2 detected inverts depending whether the address information represented by the sawtooth wobble 238b or 239b is "1" or "0", i.e., whether the wobble 238b or 239b is characterized by steep rising displacements or steep falling displacements. Hereinafter, this point will be described in further detail with reference to FIG. 25.

When the wobble pattern of the wobble 238b or 239b is extended to Fourier series, it can be seen that the wobble pattern is represented by a superposition of a waveform component oscillating in a fundamental period and a plurality of waveform components oscillating in a half period. Accordingly, the read signal S, having a waveform corresponding to the wobble pattern of the wobble 238b or 239b, is approximately represented by a superposition of the basic waveform having the basic frequency shown in portion (a) of FIG. 25 and the second harmonic S2 having a frequency twice as high as the basic frequency as shown in portion (b) of FIG. 25. Thus, when the basic waveform component is removed from the read signal S, the second harmonic S2 can be extracted. As shown in portion (b) of FIG. 25, the waveform of the second harmonic S2 may be indicated by either the solid curve or dashed curve. That is to say, the second harmonic S2 may have its waveform indicated by either the solid curve or the dashed curve depending on the wobble pattern of the wobble 238b or 239b.

The technique that has already been described with reference to FIG. 24 is also applicable for use to distinguish the two types of second harmonics S2 shown in portion (b) of FIG. 25 from each other. Specifically, a carrier signal (i.e., second sync signal) C2, which is synchronized with, and has the same frequency as, the second harmonic S2, is generated and multiplied by the second harmonic S2. And when the resultant multiplied signal S2×C2 is integrated for a predetermined period of time, the information allocated to the given sub-block can be defined either as "1" or as "0".

More specifically, by getting the multiplication and integration operations performed by the multiplier 512 and integrator 513, respectively, as shown in FIG. 23, the address information recorded (i.e., "1" or "0") can be detected by the heterodyne detection technique in accordance with the phase of the second harmonic S2. The "predetermined period" herein refers to an interval in which a gate signal G2 is asserted, i.e., an interval in which the sawtooth wobble 238b or 239b is scanned by the read laser beam, as shown in FIGS. 21 and 22. The gate signal G2 may be generated by the same technique as the gate signal G1.

As shown in FIG. 23, a ½ frequency divider 503 is preferably provided for the feedback loop formed by the PL1 502. Then, the carrier signal C2 having the twice higher frequency can be output from the PLL 502 to the multiplier 512 as well as to the input terminal of the frequency divider 503.

FIGS. 21 and 22 each show the accumulated value AS associated with the supplementary address information that has been obtained by the method described above and another accumulated value AM associated with the address information detection signal that has been recorded as the sawtooth wobble within the block. As shown in FIG. 23, the accumulated values AS and AM are added together by an adder 520, thereby increasing the SNR of the resultant integrated signal ACC. As a result, the address can be read correctly with much more certainty.

As shown in FIGS. 21 and 22, the integrated signal ACC is sampled and held synchronously with the timing pulse SH and then the sampled and held value is compared with a reference value GND, thereby defining the address information as "1" or "0". The integrated signal ACC may be sampled and held by the sample-and-hold circuit (S/H) 521 shown in FIG. 23. And the sampled and held value may be compared with the reference value GND by the comparator 522 shown in FIG. 23.

It should be noted that the integrator 505 or 513 is reset at an appropriate timing (except the integration interval in which the gate signal G1 or G2 is asserted), thereby resetting the integrated signal ACC to zero (i.e., initial value).

In the preferred embodiment described above, time lags such as a group of delays caused by the bandpass filters or circuit delay are totally out of consideration. In an actual apparatus, however, its design should be optimized with these time lags taken into account.

Also, in the preferred embodiment described above, each wobble representing the address information has a sawtooth shape that is characterized by the gradient of its rising or falling displacements. Generally speaking, though, a "difference in shape" between two waveforms having periodic repetitive patterns is created by the difference in amplitude or phase between their harmonic components. Accordingly, as long as information can be recorded by utilizing the "difference in shape" between wobbles, the effects of the present invention are also achievable. That is to say, the present invention is not limited to the sawtooth shapes described above. Nevertheless, the sawtooth shape is believed to be one of the most preferable wobble shapes because the phase of a second harmonic, realizing a relatively good SNR, changes remarkably in a sawtooth waveform.

Furthermore, in the preferred embodiment described above, after the multiplied signals have been integrated by the integrators 505 and 513, respectively, the resultant integrals are added together by the adder 520 as shown in FIG. 23. However, since the integrators 505 and 513 are supposed to add up the products obtained by the multiplier 504 and those obtained by the multiplier 512, respectively, the function of the adder 520 may be incorporated into the integrator 505 or 513. For example, the functions of the integrators 505 and 513 and the adder 520 may be performed by a single capacitor for receiving currents that have been supplied from the multipliers 504 and 512.

Furthermore, in the preferred embodiment described above, the multipliers 504 and 512 are used to detect the phase of the address information recorded. Alternatively, any other type of arithmetic or logic elements may also be used as long as the phase information is detectible. For example, a logic element such as an exclusive-OR (EXOR) gate for use in a PLL and other circuits may also be used to detect the phase of the address information.

In an optical disk medium according to various preferred embodiments of the present invention, an identification mark for use to identify a sub-block (i.e., sub-block mark) is provided for each of a huge number of sub-blocks (i.e., unit sections) that are arranged along the track groove. Thus, any sub-block can be detected easily. Particularly when the information "1" or "0" represented by the wobble of a portion of the track groove for a given sub-block is also represented by the identification mark of the same sub-block, that information represented by the wobble of the sub-block can be readjust as intended.

While the present invention has been described with respect to preferred embodiments thereof, it will be apparent to those skilled in the art that the disclosed invention may be modified in numerous ways and may assume many preferred embodiments other than those specifically described above. Accordingly, it is intended by the appended claims to cover all modifications of the invention that fall within the true spirit and scope of the invention.

What is claimed is:

1. An optical disk medium which comprises a track groove along which one or more blocks of information is recorded,
   wherein a leading part and a following part of data signals in each block of information are occupied by signals of particular pattern,
   wherein a block mark is provided for indicating a position that the block of information is recorded by wobbling at least a part of said track groove in a sine wave curve, and both a beginning position of the leading part and a finishing position of the following part is located in an area where said block mark is not formed.

2. The optical disk medium of claim 1, wherein the block mark includes locally changing the phase of the sine wave wobble.

3. The optical disk medium of claim 1, wherein the block mark is provided with a sine wobble having a frequency different from that of the other parts of the track groove.

4. The optical disk medium of claim 1, wherein the information represented by the wobble shape of the track groove is also represented by a sub-block mark.

5. An optical disk medium of claim 1, which comprises a track groove thereon and on which information is recorded along the track groove on a block unit basis, the block unit having a predetermined length,
   wherein the block unit includes a number of sub-blocks that are arranged along the groove,
   wherein a sub-block mark is provided wobbling in a sine wave curve within each said sub-block and used to identify the sub-block, and
   wherein a part of the track groove has a sawtooth-like wobble shape that is defined by a combination of a steep displacement pattern and a gentle displacement pattern to represent address information of the block unit.

* * * * *